(12) United States Patent
Shafer

(10) Patent No.: US 7,096,256 B1
(45) Date of Patent: Aug. 22, 2006

(54) APPLYING CONFIGURATION GROUP INFORMATION TO TARGET CONFIGURATION INFORMATION

(75) Inventor: Philip Austin Shafer, Raleigh, NC (US)

(73) Assignee: Juniper Network, Inc., Sunnyvale, CA (US)

( * ) Notice: Subject to any disclaimer, the term of this patent is extended or adjusted under 35 U.S.C. 154(b) by 811 days.

(21) Appl. No.: 09/793,724

(22) Filed: Feb. 26, 2001

(51) Int. Cl.
*G06F 15/177* (2006.01)
*G06F 3/00* (2006.01)

(52) U.S. Cl. ............... 709/220; 709/221; 709/250; 710/8

(58) Field of Classification Search ............ 709/220, 709/221, 250
See application file for complete search history.

(56) References Cited

U.S. PATENT DOCUMENTS

| | | | |
|---|---|---|---|
| 6,009,081 A * | 12/1999 | Wheeler et al. | 370/255 |
| 6,052,669 A * | 4/2000 | Smith et al. | 705/26 |
| 6,286,038 B1 * | 9/2001 | Reichmeyer et al. | 709/220 |
| 6,772,204 B1 * | 8/2004 | Hansen | 709/220 |
| 6,944,183 B1 * | 9/2005 | Iyer et al. | 370/466 |

* cited by examiner

*Primary Examiner*—Kim Huynh
*Assistant Examiner*—Alan S. Chen
(74) *Attorney, Agent, or Firm*—Straub and Pokotylo; John C. Pokotylo

(57) ABSTRACT

An interface permitting users (i) to create a group (also referred to as a "source") containing configuration statements and (ii) to direct the inheritance of that group's statements in the rest of the configuration information (also referred to as a "target"). The same group can be applied to different sections of the configuration information. Different sections of one group's configuration statements can be inherited in different places in the configuration information. Supporting such configuration groups allows users to create smaller, more logically constructed configuration files, thereby making it easier to configure and maintain data forwarding device software. For example, users can group together statements that are repeated in many places in the configuration, such as when configuring interfaces, and thereby limit updates to just the group. Users can also use wildcards in a configuration group to allow configuration information of the configuration group to be inherited by any object(s) in the target configuration that matches a wildcard expression.

36 Claims, 38 Drawing Sheets

*[edit chassis] Hierarchy Level*

```
chassis {
    alarm {
        interface-type {
            alarm-name (red | yellow | ignore);
        }
    }
    filter-check days;
    fpc slot-number {
        pic pic-number {
            framing (sdh | sonet);
            no-concatenate;
        }
    }
    (no-source-route | source-route);
    redundancy {
        routing-engine slot-number (master | backup | disabled );
        ssb slot-number (always | preferred);
    }
} # End of [edit chassis] hierarchy level
```

FIGURE 8

*[edit class-of-service] Hierarchy Level*

```
class-of-service {
    input {
        fpc fpc-number {
            precedence-map map-name;
        }
        interfaces {
            interface-name {
                inet-precedence-map;
                mpls-cos-map;
                unit unit-number {
                    output-queue queue-number;
                }
            }
        }
        precedence-map map-name {
            bits precedence-bit output-queue queue-number;
        }
    }
    output {
        drop-profile profile-name {
            stream-profile {
                fill-level fill-percentage drop-probability probability-percentage;
            }
            plp-set-queue-profile {
                fill-level fill-percentage drop-probability probability-percentage;
            }
            plp-clear-queue-profile {
                fill-level fill-percentage drop-probability probability-percentage;
            }
        }
        fpc fpc-number {
            drop-profile profile-name;
        }
        interfaces {
            interface-name {
                transmit-queues {
                    output-queue queue-number bandwidth percentage;
                }
                weighted-round-robin {
                    output-queue queue-number weight percentage;
                }
                unit unit-number {
                    precedence-rewrite {
                        output-queue queue-number {
                            plp-clear rewrite-bits precedence-bit;
                            plp-set rewrite-bits precedence-bit;
                        }
                    }
                }
            }
        }
    }
    policy {
        class class-name {
            classification-override {
                output-queue queue-number;
            }
        }
    }
} # End of [edit class-of-service] hierarchy level
```

FIGURE 9

*[edit firewall] Hierarchy Level*

```
firewall {
    filter filter-name {
        term term-name {
            from {
                match-conditions;
            }
            then {
                action;
                action-modifiers;
            }
        }
    }
}   # End of [edit firewall] hierarchy level
```

FIGURE 10

*[edit forwarding-options] Hierarchy Level*

```
forwarding-options {
    sampling {
        disable;
        input {
            family inet {
                rate number;
                run-length number;
            }
        }
        output {
            cflowd hostname {
                engine-id idnumber;
                (local-dump | no-local-dump);
                port portnumber;
                version format;
            }
            file {
                filename filename;
                files number;
                size bytes;
                (stamp | no-stamp);
                (world-readable | no-world-readable);
            }
        }
        traceoptions {
            file filename {
                files number;
                size bytes;
                (world-readable | no-world-readable);
            }
        }
    }
} #End of [edit forwarding-options] hierarchy level
```

FIGURE 11

*[edit groups] Hierarchy Level*

```
groups {
    group-name {
        configuration-data;
    }
} #End of [edit groups] hierarchy level
```

FIGURE 12

*[edit interfaces] Hierarchy Level*

```
interfaces {
   traceoptions {
      file filename <size size> <files number>;
   }
   interface-name {
      disable;
      atm-options {
         vpi vpi-identifier max-vcs vcs-value;
         ilmi;
      }
      clocking clock-source;
      dce;
      description text;
      e1-options {
         fcs (32 | 16);
         framing (g704 | unframed);
         idle-cycle-flag (flags | ones);
         loopback (local | remote);
         start-end-flag (shared | filler);
         timeslots slot-number;
      }
      e3-options {
         bert-algorithm algorithm;
         bert-error-rate rate;
         bert-period seconds;
         compatibility-mode (digital-link | kentrox);
         fcs (32 | 16);
         idle-cycle-flag value;
         loopback (local | remote);
         (payload-scrambler | no-payload-scrambler);
         start-end-flag value;
      }
      encapsulation type;
      fastether-options {
         (loopback | no-loopback);
         source-address-filter {
            mac-address;
         }
         (source-filtering | no-source-filtering);
      }
      gigether-options {
         flow-control;
         (loopback | no-loopback);
         source-address-filter {
            mac-address;
         }
         (source-filtering | no-source-filtering);
      }
      hold-time seconds;
      link-mode mode;
      mac mac-address;
      mtu bytes;
      no-keepalives;
      no-traps;
      receive-bucket {
         overflow (tag | discard);
         rate speed;
         threshold number;
      }
```

FIGURE 13a

```
sonet-options {
  aps {
    advertise-interval milliseconds;
    authentication-key key;
    force;
    hold-time milliseconds;
    lockout;
    neighbor address;
    paired-group group-name;
    protect-circuit group-name;
    request;
    revert-time seconds;
    working-circuit group-name;
  }
  bytes {
    e1-quiet value;
    f1 value;
    f2 value;
    s1 value;
    z3 value;
    z4 value;
  }
  fcs (32 | 16);
  loopback (local | remote);
  path-trace trace-string;
  (payload-scrambler | no-payload-scrambler);
  rfc-2615;
  (z0-increment | no-z0-increment);
}
speed (10m | 100m);
t1-options {
  buildout (0-133 | 133-266 | 266-399 | 399-532 | 532-655);
  byte-encoding (nx64 | nx56);
  fcs (32 | 16);
  framing (sf | esf);
  idle-cycle-flags (flags | ones);
  invert-data;
  line-encoding (ami | b8zs);
  loopback (local | remote);
  start-end-flag (shared | filler);
  timeslots slot-number;
}
t3-options {
  bert-algorithm algorithm;
  bert-error-rate rate;
  bert-period seconds;
  (cbit-parity | no-cbit-parity);
  compatibility-mode (digital-link | kentrox | larscom) <subrate value>;
  fcs (32 | 16);
  (feac-loop-respond | no-feac-loop-respond);
  idle-cycle-flag value;
  (long-buildout | no-long-buildout);
  loopback (local | remote);
  (payload-scrambler | no-payload-scrambler);
  start-end-flag value;
}
traceoptions {
  flag flag <flag-modifier> <disable>;
}
transmit-bucket {
  overflow (tag | discard);
  rate speed;
```

FIGURE 13b

```
       threshold number;
}
vlan-tagging;
unit logical-unit-number {
   disable;
   dlci identifier;
   encapsulation type;
   inverse-arp;
   multicast-dlci dlci-identifier;
   multicast-vci vpi-identifier.vci-identifier;
   multipoint;
   no-traps;
   oam-liveness {
      up-count cells;
      down-count cells;
   }
   oam-period seconds;
   point-to-point;
   shaping {
      (cbr rate | vbr peak rate sustained rate burst length);
      queue-length number;
   }
   tunnel {
      source address;
      destination address;
      ttl number;
   }
   vci vpi-identifier.vci-identifier;
   vlan-id number;
   family family {
      filter {
         input filter-name;
         output filter-name;
         group filter-group-number;
      }
      mtu size;
      multicasts-only;
      no-redirects;
      primary;
      address address {
         arp ip-address mac mac-address <publish>;
         destination address;
         broadcast address;
         multipoint-destination destination-address (dlci dlci-identifier | vci vci-identifier);
         multipoint-destination destination-address {
            inverse-arp;
            oam-liveness {
               up-count cells;
               down-count cells;
            }
            oam-period seconds;
            shaping {
               (cbr rate | vbr peak rate sustained rate burst length);
               queue-length number;
            }
            vci vpi-identifier.vci-identifier;
         }
         primary;
         preferred;
```

FIGURE 13c

```
vrrp-group group-number {
    virtual-address [ addresses ];
    priority number;
    advertise-interval seconds;
    authentication-type authentication;
    authentication-key key;
    (preempt | no-preempt);
    track {
        interface interface-name priority-cost cost;
    }
                }
            }
          }
        }
      }
    }
  } # End of [edit interfaces] hierarchy level
```

FIGURE 13d

*[edit policy-options] Hierarchy Level*

```
policy-options {
    as-path name regular-expression;
    community name members [ community-ids ];
    damping name {
        disable;
        half-life minutes;
        max-suppress minutes;
        reuse number;
        suppress number;
    }
    policy-statement policy-name {
        term term-name {
            from {
                match-conditions;
                route-filter destination-prefix match-type <actions>;
                prefix-list name;
            }
            to {
                match-conditions;
            }
            then actions;
        }
    }
    prefix-list name {
        ip-addresses;
    }
} # End of [edit policy-options] hierarchy level
```

FIGURE 14

*[edit protocols] Hierarchy Level*

```
protocols {
    bgp {
        advertise-inactive;
        authentication-key key;
        cluster cluster-identifier;
        damping;
        description text-description;
        disable;
        export [policy-name];
```

BGP

FIGURE 15a

```
family inet {
    (any | unicast | multicast) {
        prefix-limit {
            maximum number;
            teardown <percentage>;
        }
    }
}
hold-time seconds;
import [policy-name];
keep (all | none);
local-address address;
local-as autonomous-system <private>;
local-preference local-preference;
log-updown;
metric-out metric;
multihop <ttl-value>;
no-aggregator-id;
no-client-reflect;
out-delay seconds;
passive;
path-selection (cisco-non-deterministic | always-compare-med);
peer-as autonomous-system;
preference preference;
remove-private;
traceoptions {
    file name <replace> <size size> <files number> <no-stamp>
        <(world-readable | no-world-readable)>;
    flag flag <flag-modifier> <disable>;
}
group group-name {
    advertise-inactive;
    allow [network/masklen];
    authentication-key key;
    cluster cluster-identifier;
    damping;
    description text-description;
    export [policy-name];
    family inet {
        (any | unicast | multicast) {
            prefix-limit {
                maximum number;
                teardown <percentage>;
            }
        }
    }
    hold-time seconds;
    import [policy-name];
    keep (all | none);
    local-address address;
    local-as autonomous-system <private>;
    local-preference local-preference;
    log-updown;
    metric-out metric;
    multihop <ttl-value>;
    multipath;
    no-aggregator-id;
    no-client-reflect;
    out-delay seconds;
    passive;
    peer-as autonomous-system;
```

FIGURE 15b

```
preference preference;
protocol protocol;
remove-private;
traceoptions {
    file name <replace> <size size> <files number> <no-stamp>
        <(world-readable | no-world-readable)>;
    flag flag <flag-modifier> <disable>;
}
type type;
neighbor address {
    advertise-inactive;
    authentication-key key;
    cluster cluster-identifier;
    damping;
    description text-description;
    export [policy-name];
    family inet {
        (any | unicast | multicast) {
            prefix-limit {
                maximum number;
                teardown <percentage>;
            }
        }
    }
    hold-time seconds;
    import policy-name;
    keep (all | none);
    local-address address;
    local-as autonomous-system <private>;
    local-preference local-preference;
    log-updown;
    metric-out metric;
    multihop <ttl-value>;
    multipath;
    no-aggregator-id;
    no-client-reflect;
    out-delay seconds;
    passive;
    peer-as autonomous-system;
    preference preference;
    protocol protocol;
    traceoptions {
        file name <replace> <size size> <files number> <no-stamp>
            <(world-readable | no-world-readable)>;
        flag flag <flag-modifier> <disable>;
    }
  }
 }
}
} # End of [edit protocols bgp] hierarchy level
```

FIGURE 15c

Connections
```
connections {
    interface-switch connection-name {
        interface interface-name.unit-number;
        interface interface-name.unit-number;
    }
    lsp-switch connection-name {
        transmit-lsp label-switched-path;
        receive-lsp label-switched-path;
    }
    remote-interface-switch connection-name {
        interface interface-name.unit-number;
        transmit-lsp label-switched-path;
        receive-lsp label-switched-path;
    }
} # End of [edit protocols connections] hierarchy level
```

DVMRP
```
dvmrp {
    disable;
    export [ policy-names ];
    import [ policy-names ];
    rib-group group-name;
    traceoptions {
        file name <replace> <size size> <files number> <no-stamp>
            <(world-readable | no-world-readable)>;
        flag flag <flag-modifier> <disable>;
    }
    interface interface-name {
        disable;
        hold-time seconds;
        metric metric;
    }
} # End of [edit protocols dvmrp] hierarchy level
```

IGMP
```
igmp {
    traceoptions {
        file name <replace> <size size> <files number> <no-stamp>
            <(world-readable | no-world-readable)>;
        flag flag <flag-modifier> <disable>;
    }
    query-interval seconds;
    query-last-member-interval seconds;
    query-response-interval seconds;
    robust-count seconds;
    interface interface-name {
        disable;
        version seconds;
    }
} # End of [edit protocols igmp] hierarchy level
```

IS-IS
```
isis {
    disable;
    authentication-key key;
    authentication-type authentication;
    export [ policy-names ];
    level level-number {
        authentication-key key;
        authentication-type authentication;
        external-preference preference;
        preference preference;
        wide-metrics-only;
    }
```

FIGURE 15d

```
              lsp-lifetime seconds;
              no-authentication-check;
              overload <timeout seconds>;
              reference-bandwidth reference-bandwidth;
              traffic-engineering {
                 disable;
                 shortcuts;
              }
              traceoptions {
                 file name <replace> <size size> <files number> <no-stamp>
                    <(world-readable | no-world-readable)>;
                 flag flag <flag-modifier> <disable>;
              }
              interface interface-name {
                 disable;
                 csnp-interval seconds;
                 hello-authentication-key key;
                 hello-authentication-type authentication;
                 lsp-interval milliseconds;
                 mesh-group (value | blocked);
                 passive;
                 level level-number {
                    disable;
                    hello-authentication-key key;
                    hello-authentication-type authentication;
                    hello-interval seconds;
                    hold-time seconds;
                    metric metric;
                    passive;
                    priority priority;
                    te-metric metric;
                 }
              }
           } # End of [edit protocols isis] hierarchy level LDP        ldp {
              interface interface-name {
                 disable;
                 hello-interval seconds;
                 hold-time seconds;
              }
              keepalive-interval seconds;
              keepalive-timeout seconds;
              preference preference;
              traceoptions {
                 file name <replace> <size size> <files number> <no-stamp>
                    <(world-readable | no-world-readable)>;
                 flag flag <flag-modifier> <disable>;
              }
           } # End of [edit protocols ldp] hierarchy level MPLS       mpls {
              disable;
              no-propagate-ttl;
              admin-groups {
                 group-name group-value;
              }
              log-updown {
                 (syslog | no-syslog);
                 (trap | no-trap);
              }
```

FIGURE 15e

```
optimize-aggressive;
path path-name {
   disable;
   address <strict | loose>;
}
statistics {
   file filename size size files number <no-stamp>;
   interval seconds;
}
traceoptions {
   file name <replace> <size size> <files number> <no-stamp>
      <(world-readable | no-world-readable)>;
   flag flag <flag-modifier> <disable>;
}
traffic-engineering (bgp | bgp-igp);
label-switched-path lsp-path-name {
   disable;
   to address;
   from address;
   adaptive;
   admin-group {
      include [ group-names ];
      exclude [ group-names ];
   }
   bandwidth bps;
   class-of-service class-of-service;
   fast-reroute {
      bandwidth bps;
      hop-limit number;
      include group-names;
      exclude group-names;
   }
   hop-limit number;
   ldp-tunneling;
   metric metric;
   no-cspf;
   no-decrement-ttl;
   optimize-timer seconds;
   preference preference;
   priority setup-priority hold-priority;
   (random | least-fill | most-fill);
   (record | no-record);
   retry-limit number;
   retry-timer seconds;
   standby;
   primary path-name {
      adaptive;
      admin-group {
         include [ group-names ];
         exclude [ group-names ];
      }
      bandwidth bps;
      class-of-service class-of-service;
      hop-limit number;
      no-cspf;
      optimize-timer seconds;
      preference preference;
      priority setup-priority hold-priority;
      (record | no-record);
      standby;
}
```

FIGURE 15f

```
            secondary path-name {
              adaptive;
              admin-group {
                include group-names;
                exclude group-names;
              }
              bandwidth bps;
              class-of-service class-of-service;
              hop-limit number;
              no-cspf;
              optimize-timer seconds;
              preference preference;
              priority setup-priority hold-priority;
              (record | no-record);
              standby;
            }
            install {
              destination-prefix/prefix-length <active>;
            }
          }
          interface (interface-name | all) {
            disable;
            admin-group {
              group-name;
            }
            label-map in-label {
              (nexthop (address | interface-name | address/interface-name)) | (reject | discard);
              (pop | (swap <out-label>);
              class-of-service class-of-service;
              preference preference;
              type type;
            }
          }
          static-path inet {
            prefix {
              nexthop (address | interface-name | address/interface-name);
              push out-label;
              class-of-service class-of-service;
              preference preference;
            }
          }
        }
      } # End of [edit protocols mpls] hierarchy level MSDP   msdp {
         disable;
         export [ policy-names ];
         import [ policy-names ];
         rib-group group-name;
         traceoptions {
           file name <replace> <size size> <files number> <no-stamp>
             <(world-readable | no-world-readable)>;
           flag flag <flag-modifier> <disable>;
         }
         peer address {
           disable;
           local-address address;
           export [ policy-names ];
           import [ policy-names ];
           traceoptions {
             file name <replace> <size size> <files number> <no-stamp>
               <(world-readable | no-world-readable)>;
```

FIGURE 15g

```
                    flag flag <flag-modifier> <disable>;
                  }
                }
                group group-name {
                  disable;
                  export [ policy-names ];
                  import [ policy-names ];
                  local-address address;
                  traceoptions {
                    file name <replace> <size size> <files number> <no-stamp>
                       <(world-readable | no-world-readable)>;
                    flag flag <flag-modifier> <disable>;
                  }
                  peer address; {
                    disable;
                    export [ policy-names ];
                    import [ policy-names ];
                    local-address address;
                    mode <(mesh-group | standard)>;
                    traceoptions {
                      file name <replace> <size size> <files number> <no-stamp>
                         <(world-readable | no-world-readable)>;
                      flag flag <flag-modifier> <disable>;
                    }
                  }
                }
              } #End of [edit protocols msdp] hierarchy level OSPF          ospf {
                disable;
                export [ policy-names ];
                external-preference preference;
                preference preference;
                reference-bandwidth reference-bandwidth;
                traffic-engineering {
                  no-topology;
                  shortcuts;
                }
                traceoptions {
                  file name <replace> <size size> <files number> <no-stamp>
                     <(world-readable | no-world-readable)>;
                  flag flag <flag-modifier> <disable>;
                }
                area area-id {
                  area-range network/masklen <restrict>;
                  authentication-type authentication;
                  interface interface-name {
                    disable;
                    authentication-key key <key-id identifier>;
                    dead-interval seconds;
                    hello-interval seconds;
                    interface-type type;
                    metric metric;
                    neighbor address <eligible>;
                    passive;
                    poll-interval seconds;
                    priority priority;
                    retransmit-interval seconds;
                    transit-delay seconds;
                    transmit-interval seconds;
                  }
```

FIGURE 15h

```
               nssa {
                  area-range network/masklen <restrict>;
                  default-metric metric;
                  (summaries | no-summaries);
               }
               stub <default-metric metric> <(summaries | no-summaries)>;
               virtual-link neighbor-id router-id transit-area area-id {
                  disable;
                  authentication-key key <key-id identifier>;
                  dead-interval seconds;
                  hello-interval seconds;
                  retransmit-interval seconds;
                  transit-delay seconds;
               }
            }
         } # End of [edit protocols ospf] hierarchy level PIM      pim {
            disable;
            dense-groups {
               addresses;
            }
            rib-group group-name;
            traceoptions {
               file name <replace> <size size> <files number> <no-stamp>
                  <(world-readable | no-world-readable)>;
               flag flag <flag-modifier> <disable>;
            }
            interface interface-name {
               disable;
               mode (dense | sparse | sparse-dense);
               priority number;
               version version;
            }
            rp {
               local {
                  disable;
                  address address;
                  group-ranges {
                     destination-mask;
                  }
                  hold-time seconds;
                  priority number;
               }
               auto-rp (announce | discovery | mapping);
               bootstrap-priority number;
               static {
                  address address {
                     version version;
                     group-ranges {
                        destination-mask;
                     }
                  }
               }
            }
         } # End of [edit protocols pim] hierarchy level RIP      rip {
            traceoptions {
               file name <replace> <size size> <files number> <no-stamp>
                  <(world-readable | no-world-readable)>;
```

FIGURE 15i

```
                        flag flag <flag-modifier> <disable>;
                    }
                    authentication-key password;
                    authentication-type type;
                    (check-zero | no-check-zero);
                    import [policy];
                    message-size number;
                    metric-in metric;
                    receive receive-options;
                    send send-options;
                    group group-name {
                        export [policy];
                        metric-out metric;
                        preference preference;
                        neighbor neighbor-name {
                            authentication-key password;
                            authentication-type type;
                            (check-zero | no-check-zero);
                            import [policy];
                            message-size number;
                            metric-in metric;
                            receive receive-options;
                            send send-options;
                        }
                    }
                } # End of [edit protocols rip] hierarchy level
```

Router Discovery
```
                router-discovery {
                    disable;
                    traceoptions {
                        file name <replace> <size size> <files number> <no-stamp>
                            <(world-readable | no-world-readable)>;
                        flag flag <flag-modifier> <disable>;
                    }
                    interface interface-name {
                        min-advertisement-interval seconds;
                        max-advertisement-interval seconds;
                        lifetime seconds;
                    }
                    address address {
                        (advertise | ignore);
                        (broadcast | multicast);
                        (priority priority | ineligible);
                    }
                } # End of [edit protocols router-discovery] hierarchy level
```

RSVP
```
                rsvp {
                    disable;
                    keep-multiplier number;
                    refresh-time seconds;
                    traceoptions {
                        file name <replace> <size size> <files number> <no-stamp>
                            <(world-readable | no-world-readable)>;
                        flag flag <flag-modifier> <disable>;
                    }
                    interface interface-name {
                        disable;
                        (aggregate | no-aggregate);
                        authentication-key key;
                        bandwidth bps;
```

FIGURE 15j

```
                    hello-interval seconds;
                    subscription percentage;
                }
            }  # End of [edit protocols rsvp] hierarchy level SDP/SAP     sap {
                disable;
                listen <address> <port port>;
            }  # End of [edit protocols sap] hierarchy level VRRP        traceoptions {
                flag flag;
            }  # End of [edit protocols vrrp] hierarchy level }  # End of [edit protocols] hierarchy level
```

FIGURE 15k

*[edit routing-instances] Hierarchy Level*

```
[edit]
routing-instances routing-instance-name {
   interface interface-name;
   protocols {
      ospf {
         ospf-configuration;
      }
   }
   routing-options {
      aggregate {
         defaults {
            (active | passive);
            as-path <as-path> <origin (egp | igp | incomplete | none)> <atomic-aggregate>
               <aggregator as-number in-address>;
            community ([ community-ids ] | no-advertise | no-export | no-export-subconfed | none);
            (full | brief);
            (metric | metric2 | metric3 | metric4) value;
            (preference | preference2 | color | color2) preference;
            (tag | tag2) string;
         }
      autonomous-system autonomous-system <loops number>;
      confederation confederation-autonomous-system members autonomous-system;
      fate-sharing {
         group group-name;
         cost value;
         from address [to address];
      }
      forwarding-table {
         export [ policy-names ];
      }
      generate {
         defaults {
            (active | passive);
            as-path <as-path> <origin (egp | igp | incomplete | none)> <atomic-aggregate>
               <aggregator as-number in-address>;
            community ([ community-ids ] | no-advertise | no-export | no-export-subconfed | none);
            (full | brief);
            (metric | metric2 | metric3 | metric4) value;
            (preference | preference2 | color | color2) preference;
            (tag | tag2) string;
         }
```

FIGURE 16a

```
interface-routes {
    rib-group routing-table-name;
}
martians {
    destination-prefix match-type <allow>;
}
multicast {
    scope scope-name {
        interface interface-name;
        prefix destination-prefix;
    }
}
options {
    syslog (level level | upto level);
}
rib routing-table {
    aggregate {
        defaults {
            (active | passive);
            as-path <as-path> <origin (egp | igp | incomplete | none)> <atomic-aggregate>
                <aggregator as-number in-address>;
            community ([ community-ids ] | no-advertise | no-export | no-export-subconfed | none);
            (full | brief);
            (metric | metric2 | metric3 | metric4) value;
            (preference | preference2 | color | color2) preference;
            (tag | tag2) string;
        }
        route destination-prefix {
            policy policy-name;
            (active | passive);
            as-path <as-path> <origin (egp | igp | incomplete | none)> <atomic-aggregate>
                <aggregator as-number in-address>;
            community ([ community-ids ] | no-advertise | no-export | no-export-subconfed | none);
            (full | brief);
            (metric | metric2 | metric3 | metric4) value;
            (preference | preference2 | color | color2) preference;
            (tag | tag2) string;
        }
    generate {
        defaults {
            (active | passive);
            as-path <as-path> <origin (egp | igp | incomplete | none)> <atomic-aggregate>
                <aggregator as-number in-address>;
            community ([ community-ids ] | no-advertise | no-export | no-export-subconfed | none);
            (full | brief);
            (metric | metric2 | metric3 | metric4) value;
            (preference | preference2 | color | color2) preference;
            (tag | tag2) string;
        }
martians {
    destination-prefix match-type <allow>;
}
```

FIGURE 16b

```
                    static {
                        defaults {
                            (active | passive);
                            as-path <as-path> <origin (egp | igp | incomplete | none)> <atomic-aggregate>
                                <aggregator as-number in-address>;
                            community ([ community-ids ] | no-advertise | no-export | no-export-subconfed | none);
                            (install | no-install);
                            (metric | metric2 | metric3 | metric4) value;
                            (preference | preference2 | color | color2) preference;
                            (readvertise | no-readvertise);
                            (no-retain | retain);
                            (tag | tag2) string;
                        }
                        route destination-prefix {
                            policy policy-name];
                            (active | passive);
                            as-path <as-path> <origin (egp | igp | incomplete | none)> <atomic-aggregate>
                                <aggregator as-number in-address>;
                            community ([ community-ids ] | no-advertise | no-export | no-export-subconfed | none);
                            (full | brief);
                            (metric | metric2 | metric3 | metric4) value;
                            (preference | preference2 | color | color2) preference;
                            (tag | tag2) string;
                        }
                    }
                    rib-groups {
                        group-name {
                            import-rib [ group-name ];
                            export-rib group-name;
                        }
                    )
                    route-record;
                    router-id address;
                    static {
                        defaults {
                            (active | passive);
                            as-path <as-path> <origin (egp | igp | incomplete | none)> <atomic-aggregate>
                                <aggregator as-number in-address>;
                            community ([ community-ids ] | no-advertise | no-export | no-export-subconfed | none);
                            (install | no-install);
                            (metric | metric2 | metric3 | metric4) value;
                            (preference | preference2 | color | color2) preference;
                            (readvertise | no-readvertise);
                            (no-retain | retain);
                            (tag | tag2) string;
                        }
                    traceoptions {
                        file name <replace> <size size> <files number> <no-stamp>
                            <(world-readable | no-world-readable)>;
                        flag flag <flag-modifier> <disable>;
                    }
                }
            }
```

FIGURE 16c

*[edit routing-options] Hierarchy Level*

```
routing-options {
    aggregate {
        defaults {
            (active | passive);
            as-path <as-path> <origin (egp | igp | incomplete | none)> <atomic-aggregate>
                <aggregator as-number in-address>;
            community ([ community-ids ] | no-advertise | no-export | no-export-subconfed | none);
            (full | brief);
            (metric | metric2 | metric3 | metric4) value;
            (preference | preference2 | color | color2) preference;
            (tag | tag2) string;
        }
        route destination-prefix {
            policy policy-name;
            (active | passive);
            as-path <as-path> <origin (egp | igp | incomplete | none)> <atomic-aggregate>
                <aggregator as-number in-address>;
            community ([ community-ids ] | no-advertise | no-export | no-export-subconfed | none);
            (full | brief);
            (metric | metric2 | metric3 | metric4) value;
            (preference | preference2 | color | color2) preference;
            (tag | tag2) string;
        }
    }
    autonomous-system autonomous-system <loops number>;
    confederation confederation-autonomous-system members autonomous-system;
    forwarding-table {
        export [ policy-names ];
    }
    generate {
        defaults {
            (active | passive);
            as-path <as-path> <origin (egp | igp | incomplete | none)> <atomic-aggregate>
                <aggregator as-number in-address>;
            community ([ community-ids ] | no-advertise | no-export | no-export-subconfed | none);
            (full | brief);
            (metric | metric2 | metric3 | metric4) value;
            (preference | preference2 | color | color2) preference;
            (tag | tag2) string;
        }
        route destination-prefix {
            policy policy-name;
            (active | passive);
            as-path <as-path> <origin (egp | igp | incomplete | none)> <atomic-aggregate>
                <aggregator as-number in-address>;
            community ([ community-ids ] | no-advertise | no-export | no-export-subconfed | none);
            (full | brief);
            (metric | metric2 | metric3 | metric4) value;
            (preference | preference2 | color | color2) preference;
            (tag | tag2) string;
        }
    }
    interface-routes {
        rib-group routing-table-name;
    }
    martians {
        destination-prefix match-type <allow>;
    }
```

FIGURE 17a

```
multicast {
  scope scope-name {
    interface interface-name;
    prefix destination-prefix;
  }
}
options {
  syslog (level level | upto level);
}
rib routing-table {
  static {
    defaults {
      (active | passive);
      as-path <as-path> <origin (egp | igp | incomplete | none)> <atomic-aggregate>
        <aggregator as-number in-address>;
      community ([ community-ids ] | no-advertise | no-export | no-export-subconfed | none);
      (install | no-install);
      (metric | metric2 | metric3 | metric4) value;
      (preference | preference2 | color | color2) preference;
      (readvertise | no-readvertise);
      (no-retain | retain);
      (tag | tag2) string;
    }
    route destination-prefix {
      next-hop;
      (active | passive);
      as-path <as-path> <origin (egp | igp | incomplete | none)> <atomic-aggregate>
        <aggregator as-number in-address>;
      community ([ community-ids ] | no-advertise | no-export | no-export-subconfed | none);
      (install | no-install);
      (metric | metric2 | metric3 | metric4) value;
      (preference | preference2 | color | color2) preference;
      (readvertise | no-readvertise);
      (no-retain | retain);
      (tag | tag2) string;
    }
  aggregate {
    defaults {
      (active | passive);
      as-path <as-path> <origin (egp | igp | incomplete | none)> <atomic-aggregate>
        <aggregator as-number in-address>;
      community ([ community-ids ] | no-advertise | no-export | no-export-subconfed | none);
      (full | brief);
      (metric | metric2 | metric3 | metric4) value;
      (preference | preference2 | color | color2) preference;
      (tag | tag2) string;
    }
    route destination-prefix {
      policy policy-name;
      (active | passive);
      as-path <as-path> <origin (egp | igp | incomplete | none)> <atomic-aggregate>
        <aggregator as-number in-address>;
      community ([ community-ids ] | no-advertise | no-export | no-export-subconfed | none);
      (full | brief);
      (metric | metric2 | metric3 | metric4) value;
      (preference | preference2 | color | color2) preference;
      (tag | tag2) string;
    }
```

FIGURE 17b

```
generate {
  defaults {
    (active | passive);
    as-path <as-path> <origin (egp | igp | incomplete | none)> <atomic-aggregate>
      <aggregator as-number in-address>;
    community ([ community-ids ] | no-advertise | no-export | no-export-subconfed | none);
    (full | brief);
    (metric | metric2 | metric3 | metric4) value;
    (preference | preference2 | color | color2) preference;
    (tag | tag2) string;
  }
  route destination-prefix {
    policy policy-name;
    (active | passive);
    as-path <as-path> <origin (egp | igp | incomplete | none)> <atomic-aggregate>
      <aggregator as-number in-address>;
    community ([ community-ids ] | no-advertise | no-export | no-export-subconfed | none);
    (full | brief);
    (metric | metric2 | metric3 | metric4) value;
    (preference | preference2 | color | color2) preference;
    (tag | tag2) string;
  }
}
martians {
  destination-prefix match-type <allow>;
}
}
rib-groups {
  group-name {
    import-rib [ group-name ];
    export-rib group-name;
  }
}
router-id address;
static {
  defaults {
    (active | passive);
    as-path <as-path> <origin (egp | igp | incomplete | none)> <atomic-aggregate>
      <aggregator as-number in-address>;
    community ([ community-ids ] | no-advertise | no-export | no-export-subconfed | none);
    (install | no-install);
    (metric | metric2 | metric3 | metric4) value;
    (preference | preference2 | color | color2) preference;
    (readvertise | no-readvertise);
    (no-retain | retain);
    (tag | tag2) string;
  }
  route destination-prefix {
    next-hop;
    (active | passive);
    as-path <as-path> <origin (egp | igp | incomplete | none)> <atomic-aggregate>
      <aggregator as-number in-address>;
    community ([ community-ids ] | no-advertise | no-export | no-export-subconfed | none);
    (install | no-install);
    (metric | metric2 | metric3 | metric4) value;
    (preference | preference2 | color | color2) preference;
    (readvertise | no-readvertise);
    (no-retain | retain);
    (tag | tag2) string;
  }
}
traceoptions {
  file name <replace> <size size> <files number> <no-stamp>
    <(world-readable | no-world-readable)>;
  flag flag <flag-modifier> <disable>;
}
} # End of [edit routing-options] hierarchy level
```

FIGURE 17c

*[edit snmp] Hierarchy Level*

```
snmp {
    description description;
    location location;
    contact contact;
    interface [ interface-names ];
    community community-name {
        authorization authorization;
        clients {
            default restrict;
            address <restrict>;
        }
    }
    trap-group group-name {
        categories category;
        targets {
            address;
        }
        version version;
    }
    traceoptions {
        file <files number> <size size>;
        flag flag <disable>;
    }
} # End of [edit snmp] hierarchy level
```

FIGURE 18

*[edit system] Hierarchy Level*

```
system {
    authentication-order [ authentication-methods ];
    backup-router address <destination destination-address>;
    compress-configuration-files;
    default-address-selection;
    dhcp-relay (server address | disable);
    diag-port-authentication (encrypted-password "password" | plain-text-password);
    domain-name domain-name;
    domain-search [domain-list];
    host-name host-name;
    location {
        altitude feet;
        country-code code;
        hcoord horizontal-coordinate;
        lata service-area;
        latitude degrees;
        longitude degrees;
        npa-nxx number;
        postal-code postal-code;
        vcoord vertical-coordinate;
    }
    login {
        message text;
        class class-name {
            allow-commands "regular-expression";
            deny-commands "regular-expression";
            idle-timeout minutes;
            permissions [ permissions ];
        }
        user user-name {
            full-name complete-name;
            uid uid-value;
            class class-name;
            authentication {
                (encrypted-password "password" | plain-text-password);
                ssh-rsa "public-key";
            }
        }
    }
    name-server {
        address;
    }
    no-redirects;
    ntp {
        authentication-key key-number type type value password;
        boot-server address;
        broadcast <address> <key key-number> <version value> <ttl value>;
        broadcast-client;
        multicast-client <address>;
        peer address <key key-number> <version value> <prefer>;
        server address <key key-number> <version value> <prefer>;
        trusted-key [ key-numbers ];
    }
    ports {
        auxiliary {
            insecure;
            speed baud-rate;
            type terminal-type;
        }
        console {
            insecure;
            speed baud-rate;
            type terminal-type;
```

FIGURE 19a

```
    }
  }
  processes {
    inet-process (enable | disable);
    interface-control (enable | disable);
    mib-process (enable | disable);
    ntp (enable | disable);

routing (enable | disable);
    snmp (enable | disable);
    watchdog (enable | disable) <timeout seconds>;
  }
  radius-server server-address {
    port number;
    retry number;
    secret password;
    timeout seconds;
  }
  root-authentication {
    (encrypted-password "password" | plain-text-password);
    ssh-rsa "public-key";
  }
  services {
    finger <connection-limit limit> <rate-limit limit>;
    ssh <connection-limit limit> <rate-limit limit>;
    telnet <connection-limit limit> <rate-limit limit>;
  }
  static-host-mapping {
    host-name {
      inet [ address ];
      sysid system-identifier;
      alias [ alias ];
    }
  }
  syslog {
    file filename {
      facility level;
      archive {
        files number;
        size size;
        (world-readable | no-world-readable);
      }
    }
    host hostname {
      facility level;
      facility-override facility;
      log-prefix string;
    }
    user (username | *) {
      facility level;
    }
    console {
      facility level;
    }
    archive {
      files number;
      size size;
      (world-readable | no-world-readable);
    }
  }
  tacplus-server server-address {
    secret password;
    single-connection;
    timeout seconds;
  }
  time-zone time-zone;
}} # End of [edit system] hierarchy level
```

FIGURE 19b

APPLYING CONFIGURATION GROUP INFORMATION TO TARGET CONFIGURATION INFORMATION

§ 1. BACKGROUND OF THE INVENTION

§ 1.1 Field of the Invention

The present invention concerns creating and managing configuration information for use in data forwarding devices, such as routers for example. More specifically, the present invention concerns creating a group(s) of configuration information and applying such group(s) of configuration information, according to user instructions, to the set of configuration information used by such a data forwarding device.

§ 1.2 Related Art

The description of art in this section is not, and should not be interpreted to be, an admission that such art is prior art to the present invention. The present invention may be used for creating and managing configuration information used by data forwarding devices.

Data forwarding devices, such as routers and switches, may be interconnected to form networks. The interconnections may be such that each data forwarding device has a plurality of input lines and a plurality of output lines. A basic function of these devices is to forward data received at their input lines to the appropriate output lines. Routers, for example, may determine the appropriate output lines based on a destination addresses contained in the received data and forwarding tables. Switches may be configured so that data received at input lines are provided to appropriate output lines.

Such data forwarding devices may need to be configured appropriately. This may be done by entering configuration commands, through a keyboard or other type of interface, into a data forwarding device. For example, a command line user interface may be provided for configuring the device. Other types of information or commands may also be entered into the device through the keyboard or interface.

As data forwarding devices, such as routers for example, become more complex and perform more functions, the size and complexity of configuration information increases. Much of the configuration information is repeated. Entering and managing such configuration information has become difficult, tedious, and error-prone.

Templates and scripting have been used to help users enter configuration information. More specifically, templates are used to create sections of configuration data with a user-defined set of values. The user may then refine such values by hand. Scripting uses scripts, which are essentially programs, to generate sections of configuration data using user-defined values. Unfortunately, both templates and scripting generate large amounts of configuration data which often must be displayed to, and manipulated by, a local user. Further, although templates and scripts help to create configuration data, they are less useful for changing existing configuration data. Finally, scripting and templates are most useful when the authors of such scripts or templates know, in advance, the configuration information that will be needed and which of such configuration information will be repetitious.

Accordingly, there is a need to provide better techniques to create and manage configuration information.

§ 2. SUMMARY OF THE INVENTION

The present invention describes a method for generating configuration information for use by a data forwarding device. The method may (a) define a configuration group including a group name and configuration information, (b) define a target configuration and (c) specify a point in the target configuration to inherit the configuration information of the configuration group. The configuration information may include a configuration statement. A point in the target configuration to inherit the configuration information of the configuration group may be specified by entering an apply-group instruction, which identifies the group name of the configuration group, at the point in the target configuration.

The target configuration may be arranged in a hierarchy. If so, any given level of the target configuration hierarchy may include only one apply-group instruction. In one embodiment, if any values are specified at a particular level of the hierarchy of the target configuration, such values will override values that would otherwise be inherited from the configuration group.

The configuration information may include a wildcard expression. Such a wildcard expression may include a wildcard pattern part and associated wildcard configuration information. If an existing statement in the target configuration matches the wildcard pattern, then the wildcard configuration information from the wildcard expression may be applied to the existing statement.

The present invention discloses how configuration information including a configuration group, the configuration group including a group name and configuration information, can be expanded. Such expansion may be performed by, for each piece of configuration information, (a) determining whether or not the piece of configuration information is an instruction to apply the configuration group and (b) if it is determined that the piece of configuration information is an instruction to apply the configuration group, then replacing the piece of configuration information with the configuration information of the configuration group. Whether or not the piece of configuration information is an instruction to apply the configuration group may be based on whether the piece of configuration information includes the group name of the configuration group. If the configuration information is arranged in a hierarchy, and if a given hierarchical level of the configuration information includes at least two instructions to apply at least two different configuration groups, then the order of the at least two instructions in the configuration information may be used to determine which one of the at least two different configuration groups will be applied.

The present invention also discloses a method for displaying configuration information including a configuration group, the configuration group including a group name and configuration information. Such display may be performed by, for each piece of configuration information, determining whether or not the piece of configuration information is an instruction to apply the configuration group. If it is determined that the piece of configuration information is an instruction to apply the configuration group, then the method may replace the piece of configuration information with the configuration information of the configuration group, and display, with visual emphasis, the configuration information of the configuration group. If, on the other hand, it is determined that the piece of configuration information is not an instruction to apply the configuration group, then the piece of configuration information is displayed normally. If the piece of configuration information is an instruction to apply the configuration group, then the group name of the configuration group may be displayed.

Each of the foregoing methods may be effected by executing machine-executable instructions stored on a machine-readable medium, such as a storage facility of a data forwarding device for example. Thus, each of the foregoing methods may be effected on a data forwarding device. If the data forwarding device includes interfaces for receiving and transmitting data, then the configuration information may include statements to configure the interfaces. If the data forwarding device includes a routing facility, then the configuration information may include statements to configure the routing facility. In some instances, the configuration information of the configuration group may be applied conditionally, based on at least one characteristic of the interfaces and/or of the routing facility of the data forwarding device.

§ 3. BRIEF DESCRIPTION OF THE DRAWINGS

FIG. 8 illustrates exemplary instructions and parameters for a chassis part of a set of router configuration information.

FIG. 9 illustrates exemplary instructions and parameters for a class-of-service part of a set of router configuration information.

FIG. 10 illustrates exemplary instructions and parameters for a firewall part of a set of router configuration information.

FIG. 11 illustrates exemplary instructions and parameters for a forwarding options part of a set of router configuration information.

FIG. 12 illustrates exemplary instructions and parameters for a groups part of a set of router configuration information.

FIGS. 13a–13d illustrate exemplary instructions and parameters for an interfaces part of a set of router configuration information.

FIG. 14 illustrates exemplary instructions and parameters for a policy options part of a set of router configuration information.

FIGS. 15a–15k illustrate exemplary instructions and parameters for a protocols part of a set of router configuration information.

FIGS. 16a–16c illustrate exemplary instructions and parameters for a routing-instances part of a set of router configuration information.

FIGS. 17a–17c illustrate exemplary instructions and parameters for a routing-options part of a set of router configuration information.

FIG. 18 illustrates exemplary instructions and parameters for a simple network management protocol part of a set of router configuration information.

FIGS. 19a and 19b illustrate exemplary instructions and parameters for a system part of a set of router configuration information.

§ 4. DETAILED DESCRIPTION

Figure 1:
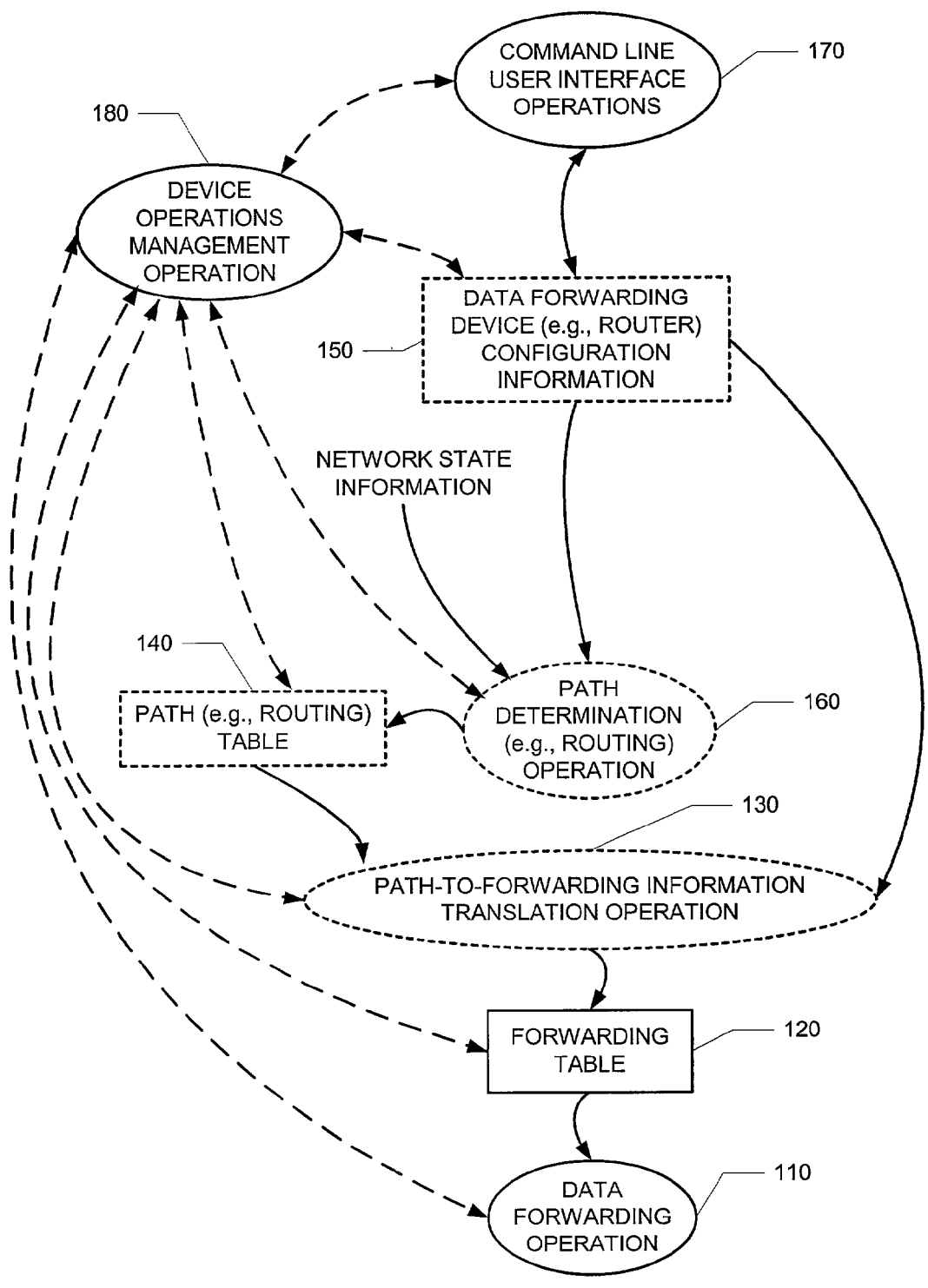
FIG. 1 is a high-level bubble chart diagram of a simple exemplary data forwarding device having a command line user interface with which the present invention may be used.

The present invention involves novel methods, apparatus and data structures for creating and managing configuration information for use by a data forwarding device, such as a router for example. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention as the following disclosed methods, apparatus and data structures and any other patentable subject matter.

The present invention discloses techniques that allow users (i) to create a group (also referred to as a "source") containing configuration statements and (ii) to direct the inheritance of that group's statements in the rest of the configuration information (also referred to as a "target"). The same group can be applied to different sections of the configuration information. Different sections of one group's configuration statements can be inherited in different places in the configuration information.

Supporting such configuration groups allows users to create smaller, more logically constructed configuration files, thereby making it easier to configure and maintain data forwarding device software. For example, users can group together statements that are repeated in many places in the configuration, such as when configuring interfaces, and thereby limit updates to just the group.

Users can also use wildcards in a configuration group to allow configuration information of the configuration group to be inherited by any object(s) in the target configuration that matches a wildcard expression.

In one embodiment, configuration groups provide a generic mechanism that can be used throughout the configuration, but that are known only to a command line user interface part of the data forwarding device software. The individual software modules (e.g., "daemons") that perform the actions directed by the configuration information may receive an expanded form of the configuration (i.e., a form of the configuration in which "apply groups" statements are replaced by the configuration information of the configuration group being applied). Such modules need not have any knowledge of configuration groups.

Configuration groups may use so-called "true inheritance", which involves a dynamic, ongoing relationship between the source of the configuration data (i.e., the configuration group) and the target (i.e., the configuration) of that data. In this way, data values changed in the configuration group may be automatically inherited by the target. The target need not contain the inherited information, although the inherited values can be (e.g., manually) overwritten in the target without affecting the source from which they were inherited. Such an inheritance model allows users to see only the instance-specific information without seeing the inherited details. A command pipe in configuration mode ("show|display inheritance") allows users to display the inherited data.

§ 4.1 EXEMPLARY ENVIRONMENTS IN WHICH THE PRESENT INVENTION MAY OPERATE

The present invention may be used in (or with) a data forwarding device. Two exemplary data forwarding devices are introduced in §§ 4.1.1 and 4.1.2 below.

§ 4.1.1 First Exemplary Data Forwarding Device

FIG. 1 is a high-level bubble chart diagram of a simple exemplary data forwarding device 100. As shown, a data forwarding operation 110 may use information in a forwarding table 120 to forward incoming data (e.g., packets) towards a final destination. For a simple data forwarding device, only these components are needed. However, in many data forwarding devices, the forwarding table 120 may be generated and updated by an optional (as indicated by phantom lines) path-to-forwarding information translation operation 130. The path-to-forwarding information translation operation 130 may perform its generation and update functions based on an optional (as indicated by phantom lines) path (e.g., routing) table 140 and device configuration information 150. The path (e.g., routing) table 140 may be generated by an optional (as indicated by phantom lines) path (e.g., route) determination operation 160 based on network state (e.g., link state) information, as well as device configuration information 150. For example, the path determination operation 160 may operate in accordance with known routing protocols to populate a routing table.

A device operations management operation 180 may directly or indirectly interact with, and manage, some or all of the operations just introduced as indicated by the dashed arrow lines. A user may use a command line user interface operation 170 for interacting with the device operations management operation 180, as well as the device configuration information 150. The present invention may concern at least a part of the command line user interface operation 170, as well as the structure of the device configuration information 150.

§ 4.1.2 Second Exemplary Data Forwarding Device

Figure 2:
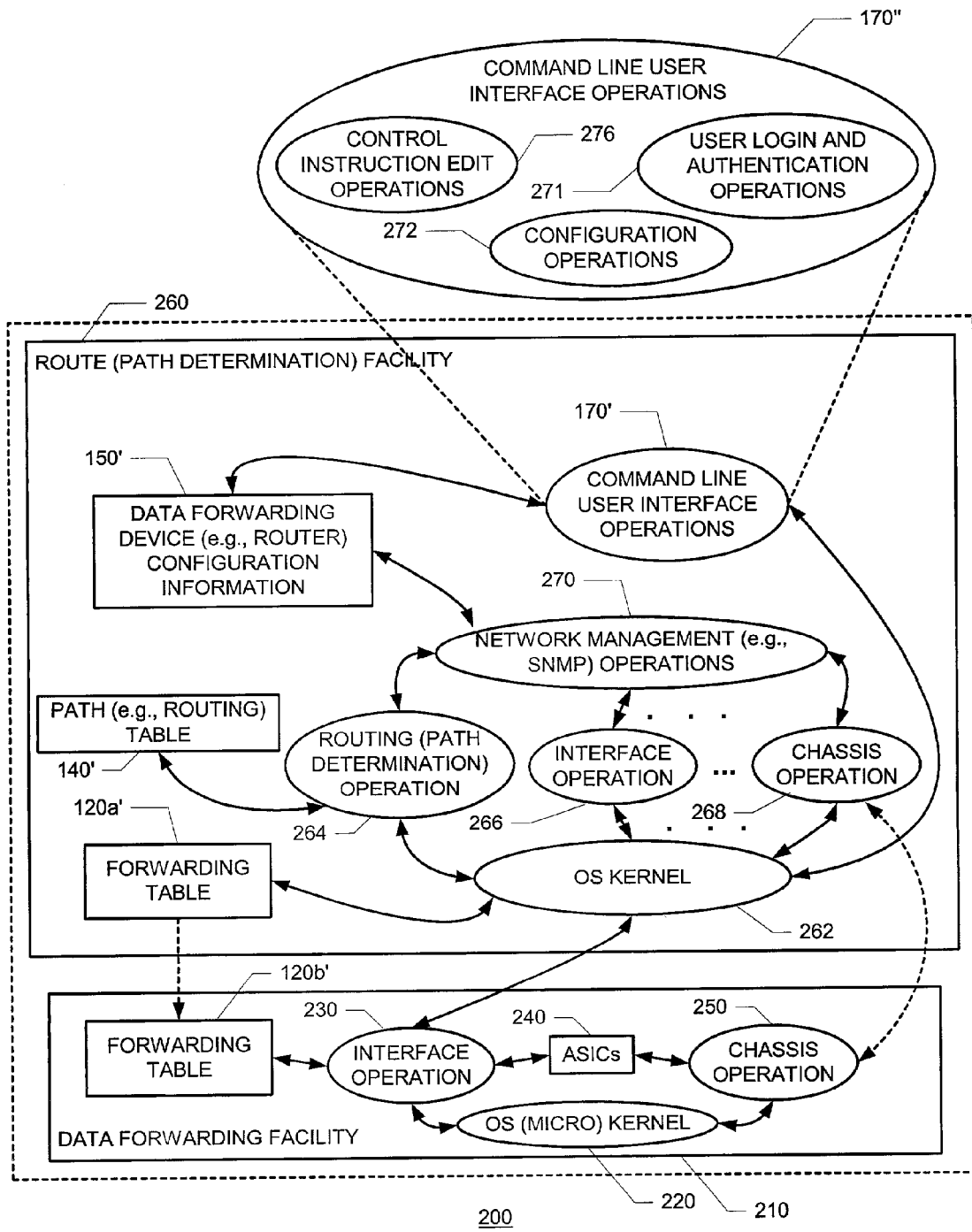
FIG. 2 is a high-level bubble chart diagram of an exemplary data forwarding device having a command line user interface with which the present invention may be used.

FIG. 2 is a high-level bubble chart diagram of an exemplary data forwarding device 200. The data forwarding device 200 may include a data (e.g., packet) forwarding facility 210 and a path (e.g., route) determination facility 260. Basically, the data forwarding facility 210 may function to forward data towards its ultimate destination, and the path determination facility 260 may function to generate and/or update a forwarding table 120a' and/or 120b' based on path (e.g., route) determinations.

In an exemplary embodiment, the data forwarding facility 210 may include an operating system (micro) kernel 220 which supports various operations (e.g., an interface operation 230 and a chassis operation 250). The exemplary data forwarding facility 210 may also include an instance of a forwarding table 120b' used to forward data towards its destination. The forwarding table instance 120b' may correspond to an instance of the forwarding table 120a' of the path determination facility 260.

In an exemplary embodiment, the path determination facility 260 may include an operating system kernel 262 which supports various operations (e.g., a path (e.g., route) determination operation 264, an interface operation 266, a chassis operation 268, command line user interface operations 170', etc.) and which may be used to generate the forwarding table instance 120a'. The path (e.g., route) determination operation 264 may be used to determine a path (e.g., routing) table 140'. Network management (e.g., SNMP) operations 270 may interact with the various operations 264,266,268 supported by the operating system kernel 262. The command line user interface operation 170' may act on configuration information 150' and may interact with the operating system kernel 262.

As shown in the blow-up of bubble 170'' in FIG. 2, the command line user interface operations 170' may include user login and authentication operations 271, configuration operations 272 and control instruction editing operations 276. In accordance with the present invention, the configuration operations 272 may use "create configuration group" and "apply configuration group" operations to help manage the configuration information 150'.

In both the device 100 of FIG. 1 and the device 200 of FIG. 2, command line user interface operations 170 and 170' are provided. The present invention may constitute a part of such a command line user interface operations 170/170'. The present invention may be used in (or with) other data forwarding devices.

§ 4.2 FUNCTIONS THAT MAY BE PERFORMED BY THE PRESENT INVENTION

The present invention may function to help users create smaller, more logically constructed configuration files, thereby simplifying the configuration and maintenance of software used by data forwarding devices, such as routers for example.

§ 4.3 EXEMPLARY OPERATIONS, ARCHITECTURE, METHODS AND DATA STRUCTURES

Operations that may be performed by the present invention are introduced in the following. Exemplary methods, data structures, and apparatus that may be used to effect such operations, are described in the following.

§ 4.3.1 Exemplary Operations and Data Structures

Figure 3:
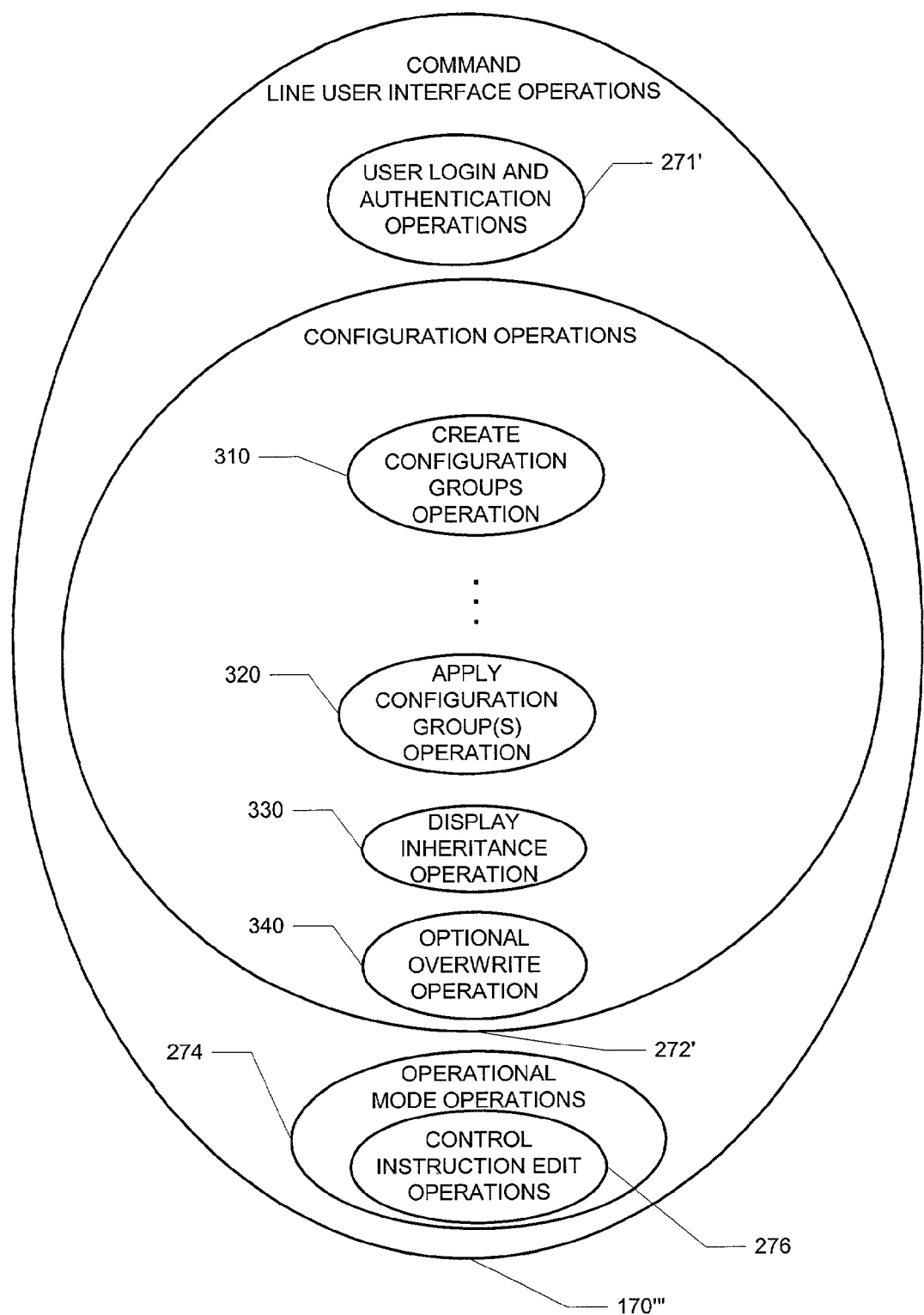
FIG. 3 is a high-level bubble chart diagram that illustrates configuration operations of which the present invention may be a part.

FIG. 3 is a high-level bubble diagram that illustrates exemplary command line user interface operations 170''', of which the present invention may be a part. As was the case in the exemplary embodiment of FIG. 2, the command line user interface operations 170''' may include user login and authentication operations 271', configuration operations 272' and control instruction edit operations 276'. The control instruction edit operations 276' may be a part of operational mode operations 274. As shown, the configuration operations 272' may include a "create configuration groups" operation 310, an "apply configuration groups" operation 320, a "display inheritance" operation 330 and an "optional overwrite" operation 340.

Other configuration operations 272' (not shown) may include, for example, an ACTIVATE operation for removing an inactive tag from an instruction, an ANNOTATE operation for annotating an instruction with a comment, a COMMIT operation for committing to current candidate configuration information, a COPY operation for copying an instruction, a DEACTIVATE operation for adding an inactive tag to an instruction, a DELETE operation for deleting a data element, an EDIT operation for editing a sub-element, an EXIT operation for leaving a current hierarchical level of configuration information, a HELP operation for providing help information, an INSERT operation for inserting a new ordered data element, a LOAD operation for loading configuration information (e.g., from an ASCII file), a QUIT operation for quitting a hierarchical level of configuration information, a RENAME operation for renaming an instruction, a ROLLBACK operation for rolling back a database to a selected one of previously committed versions of configuration information, a RUN operation for running an instruction, a SAVE command for saving configuration information, a SET operation for setting a parameter, a SHOW operation for showing a parameter, a STATUS operation for displaying a user status, a TOP operation for navigating to a top hierarchical level of configuration information, and an UP operation for navigating to a next higher hierarchical level of configuration information.

Figure 4:
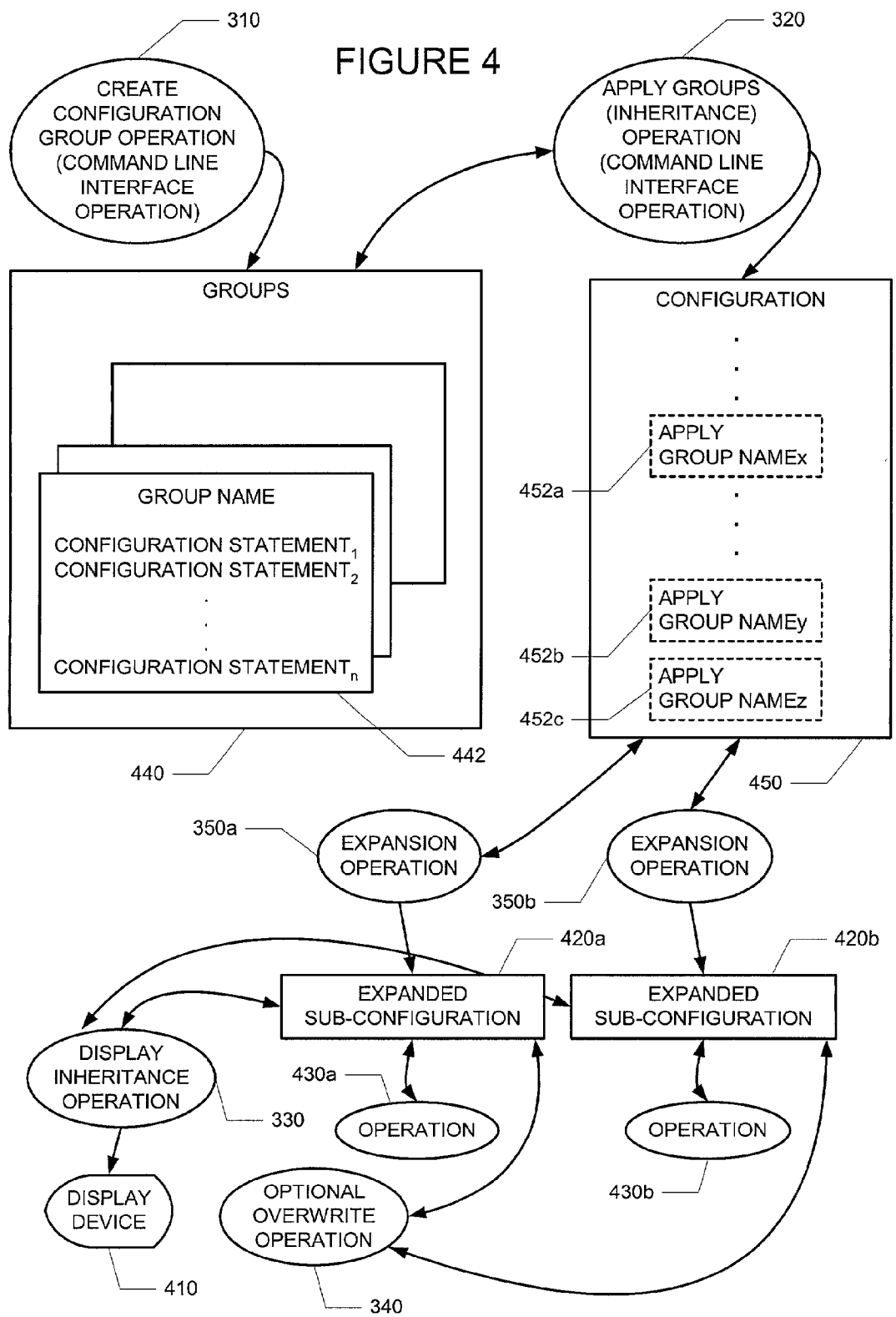
FIG. 4 is a bubble chart diagram of operations that may be supported by the present invention.

As illustrated in FIG. 4, the create configuration group operation 310 may be used to create a set 440 of one or more configuration groups 442. Each configuration group 442 may include a group name and a number of configuration statements. The apply groups operation 320 may be used to identify configuration groups 452 to be applied to the configuration 450 for the data forwarding device. For areas of the configuration 450 to inherit configuration statements, the statements are first provided in a configuration group 442. Then, that group 442 is applied (452) to the areas in the configuration 450 that require the statements.

Parts of the configuration 450 may be expanded by expansion operations 350 to generate expanded configuration parts ("sub-configurations") 420 (in which "apply groups" statements are replaced by the configuration information of the configuration group being applied) for use by various operations 430. Such operations 430 may be software modules (e.g., "daemons") used by the data forwarding device.

The display inheritance operation 330 may be used to display and visually emphasize (e.g., by prepending a double-pound symbol—## to inherited information) configuration statements and/or parameter values of an expanded sub-configuration that were inherited from a configuration group 452. Such inherited configuration statements and/or values may be rendered to a user via a display device 410. In one embodiment, inheritance is displayed by piping a "show" command through a "display inheritance" command.

An optional overwrite operation 340 may be used to permit a user to (e.g., manually) overwrite configuration statements and/or parameter values in an expanded sub-configuration 420. That is, configuration statements and/or parameter values inherited from a configuration group may be altered in the expanded configuration information (target), without changing the source configuration group.

The set of configuration information 450 may be arranged in the context of a hierarchy. In one exemplary configuration information data structure, the configuration information is defined by a hierarchy of statements. In this exemplary data structure, there are two types of statements—container statements and leaf statements. Container statements contain other statements, while leaf statements do not contain other statements. All of the container and leaf statements collectively define the configuration hierarchy. In this exemplary embodiment, each statement at the top level of the configuration hierarchy resides at the trunk (or root) level of a tree data structure. These top-level statements are often container statements that contain other statements that form branches of the tree data structure. The leaf statements form the leaves of the tree data structure. An individual hierarchy of statements (that starts at the trunk) may be referred to as a "statement path." Various statements and their inter-relationships may be stored as objects in an object-oriented database.

Figure 6:
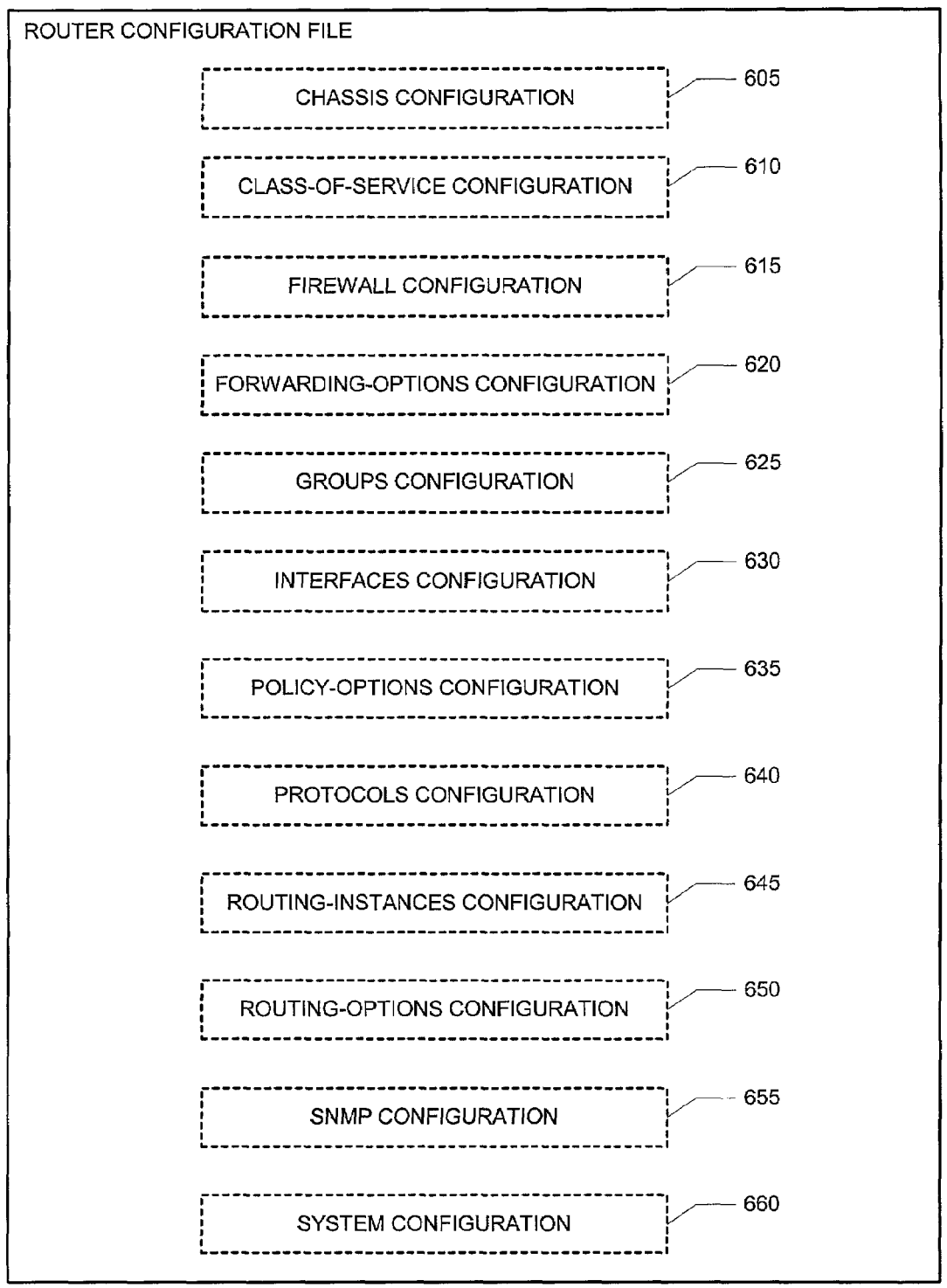
FIG. 6 is a block diagram that illustrates different types of configurations that may be used in a router configuration data structure.

Such a hierarchical data structure may be used for storing configuration information for a data forwarding device, such as a router for example. FIG. 6 illustrates exemplary container statements contained in an exemplary configuration information structure 150" for a router. As indicated, the highest level of the hierarchy may include a number of configuration categories, such as chassis configuration 605, class-of-service configuration 610, firewall configuration 615, forwarding options configuration 620, groups configuration 625, interfaces configuration 630, policy-options configuration 635, protocols configuration 640, routing instances configuration 645, routing options configuration 650, simple network management protocol (SNMP) configuration 655 and system configuration 660.

FIG. 8 illustrates exemplary statements and parameters for a chassis configuration part 605 of an exemplary router configuration 150". FIG. 9 illustrates exemplary statements and parameters for a class-of-service configuration part 610 of an exemplary router configuration 150". FIG. 10 illustrates exemplary statements and parameters for a firewall configuration part 615 of an exemplary router configuration 150". FIG. 11 illustrates exemplary statements and parameters for a forwarding options configuration part 620 of an exemplary router configuration 150". FIG. 12 illustrates exemplary statements and parameters for a groups configuration part 625 of an exemplary router configuration 150". FIG. 13, which includes FIGS. 13a through 13d, illustrates exemplary statements and parameters for an interfaces configuration part 630 of an exemplary router configuration 150". FIG. 14 illustrates exemplary statements and parameters for a policy options configuration part 635 of an exemplary router configuration 150". FIG. 15, which includes FIGS. 15a through 15k, illustrates exemplary statements and parameters for a protocols configuration part 640 of an exemplary router configuration 150". FIG. 16, which includes FIGS. 16a through 16c, illustrates exemplary statements and parameters for a routing-instances configuration part 645 of an exemplary router configuration 150". FIG. 17, which includes FIGS. 17a through 17c, illustrates exemplary statements and parameters for a routing-options configuration part 650 of an exemplary router configuration 150". FIG. 18 illustrates exemplary statements and parameters for a simple network management protocol configuration part 655 of a router configuration 150". Finally, FIGS. 19a and 19b illustrate exemplary statements and parameters for a system configuration part 660 of an exemplary router configuration 150".

Referring now to the exemplary instructions and parameters of FIG. 15 for a protocols configuration part 640 of an exemplary router configuration 150", the following statement path:

```
protocols {
    ospf{
        area 0.0.0.0{
            interface so-0/0/0{hello interval 5;
            }
            interface so-0/0/1{hello interval 5;
```

-continued

Figure 7:
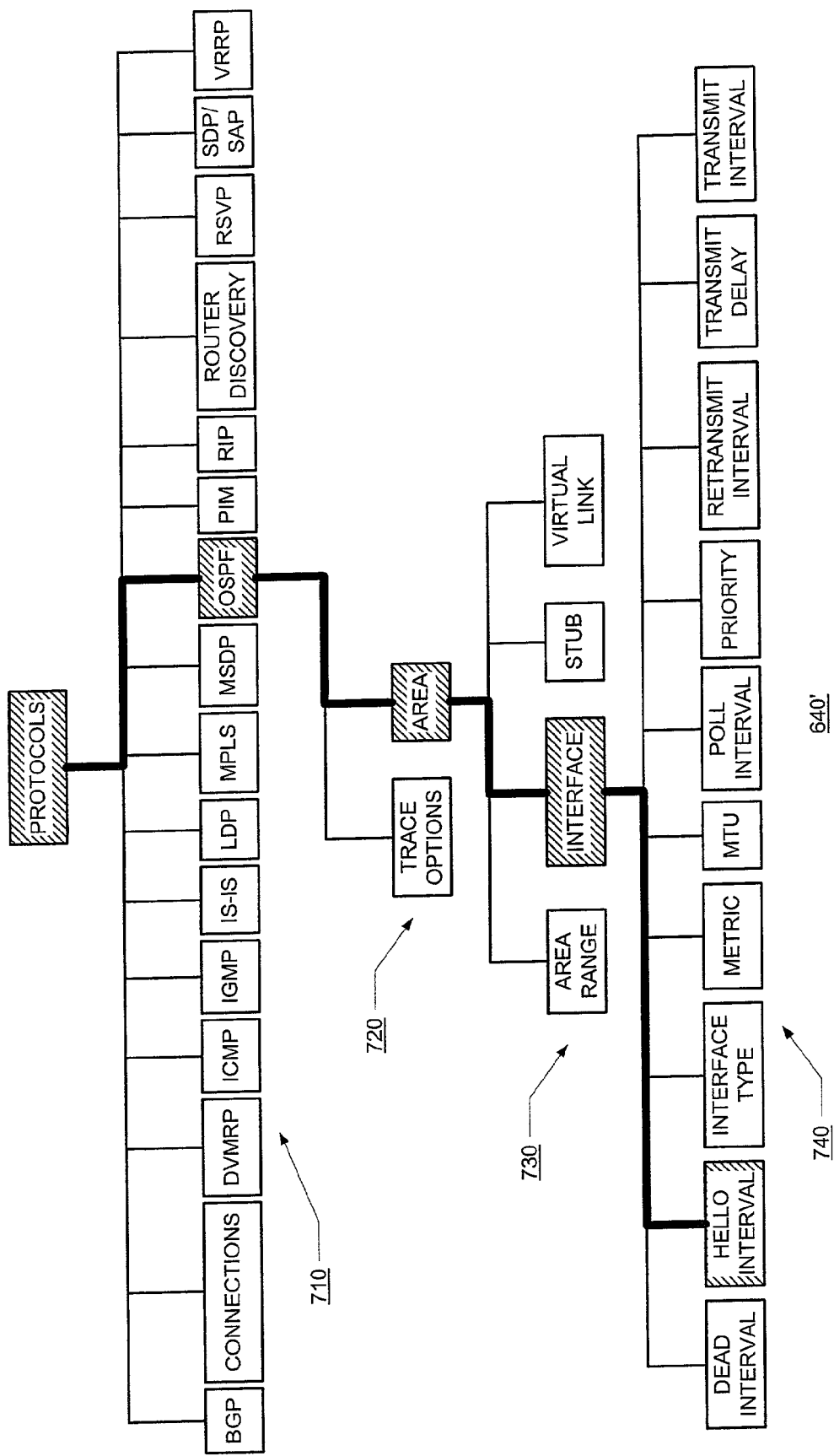
FIG. 7 illustrates an exemplary configuration hierarchy in a protocols configuration part of a set of router configuration information.

```
        }
      }
    }
}
``` is illustrated by the tree 640' of FIG. 7.

In this example, the "protocols" statement is a top-level statement at the trunk of the configuration tree. The "ospf", "area", and "interface" statements are all subordinate container statements of a higher statement in the configuration tree (i.e., the define branches). In this case, each of the "interface" statements contain a parameter value (so-0/0/0 and so-0/0/1). Finally, the "hello interval" statement is a leaf on the configuration tree. In this case, each of the "hello interval" statements contain a parameter value (5) as the length of the hello interval, in seconds, for each of the defined interfaces.

This statement path is depicted with cross-hatching and bold lines in FIG. 7. As illustrated, the "hello interval" leaf statement, at a fifth hierarchical level 740, is contained in the "interface" branch container statement. The "interface" branch container statement at the fourth hierarchical level 730 is, in turn, contained in the "area" branch container statement. The "area" branch container statement at the third hierarchical level 720 is, in turn, contained in the "ospf" branch container statement. Finally, the "ospf" branch container statement at the second hierarchical level 710 is, in turn, contained in the "protocols" root container statement at the first hierarchical level.

In the configuration statements set forth above, the hierarchical levels are defined within an open brace symbol "{" and a closed brace symbol "}" If a statement at a given hierarchical level is empty (i.e., if it contains no other statement), then the braces need not be depicted. Finally, each leaf statement (or the non-leaf statement at the otherwise lowest level of the hierarchy) may be depicted with a semicolon.

§ 4.3.2 Exemplary Methods for Configuration Operations

Figure 5:
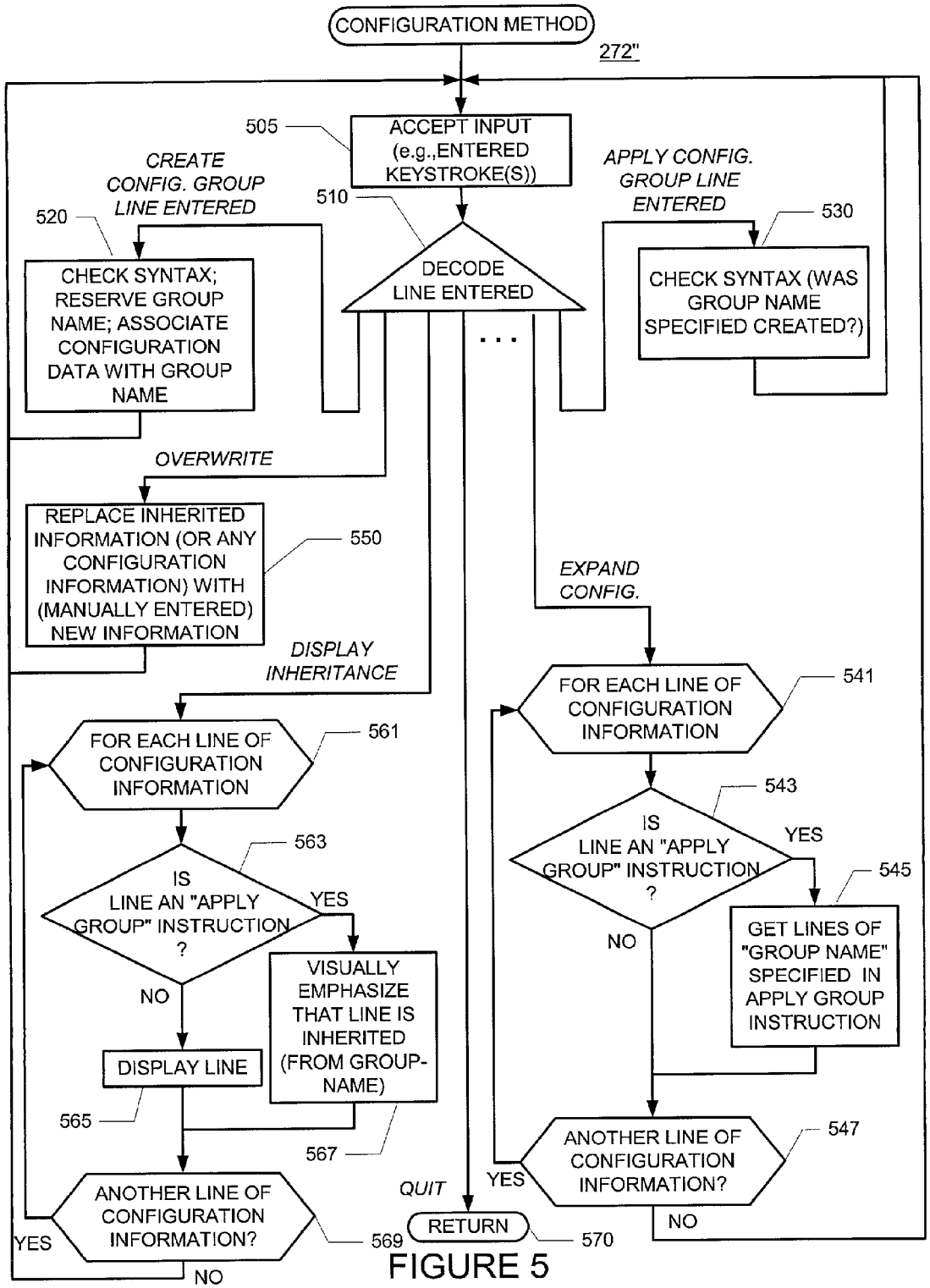
FIG. 5 is a high-level flow diagram of an exemplary method that may be used to effect at least some configuration operations.

FIG. 5 is a high-level flow diagram of an exemplary method 272" that may be used to effect configuration operations 272'. As depicted in block 505 input (e.g., entered keystrokes) is accepted. Collectively, these inputs can correspond to configuration information.

Referring to decision branch point 510, the entered input is decoded. If the decoded input indicates a "create configuration group" line, the syntax of the line may be checked, the group name may be reserved, and/or the configuration data may be associated with the group name as indicated by block 520. For example, to configure configuration groups and inheritance, a user can include the following statements in the configuration:

```
groups {
    group-name {
        configuration-data;
    }
}
```

The "group-name" is the name of a configuration group. To configure multiple groups, more than one "group-name" are specified.

The "con figuration-data" contains the configuration statements applied elsewhere in the configuration with the apply-groups statement, to have the target configuration inherit the statements in the group.

Conditional groups names may also be supported. The statements specified in such a conditional group name are only applied if a condition(s) is met. The condition(s) may be hardware dependent and/or software dependent. For example, in the context of routers that support multiple "routing engines", two special group names may be specified. The group name "re {n}" may correspond to configuration statements applied to a routing engine in slot n, where "n" is an integer. Thus, for example, the configuration specified in group re0 is only applied if the current routing engine is in slot 0. Likewise, the configuration specified in group re1 is only applied if the current routing engine is in slot 1. Therefore, multiple routing engines can use the same configuration file, each using only the configuration statements that apply to it. Each re0 or re1 group should contain, at a minimum, the configuration for the hostname and the management interface (fxp0). If each routing engine uses a different management interface, the group also should contain the configuration for the backup router and static routes.

Referring once again to decision branch point 510, if the decoded input indicates an "apply configuration group" line, the syntax of the line may be checked (e.g., whether the group name specified has been created may be checked), as indicated by block 530. Referring to FIG. 4, the apply-groups [group names] statement 452 may be used anywhere in the configuration 450 that the configuration statements contained a configuration group (identified by its group name) 442 are needed.

For example, to have a configuration inherit the statements in a configuration group, the user may include the apply-groups statement:

apply-groups [group-names];

If more than one group name is specified, they should be listed in order of inheritance priority. In one embodiment, the configuration information in the first group takes priority over the information in subsequent groups.

In the context of routers that support multiple routing engines, the user can specify re 0, re 1, . . . re n as group names. The configuration specified in group re 0 is only applied if the current routing engine is in slot 0. Likewise, the configuration specified in group re 1 is only applied if the current routing engine is in slot 1. Therefore, a number of routing engines can use the same configuration file, each using only the configuration statements that apply to it. Each "re n" group should contain, at a minimum, the configuration for the hostname and the management interface (fxp0). If each routing engine uses a different management interface, the group also should contain the configuration for the backup router and static routes.

The "apply-groups" statement can be applied at any level of the configuration hierarchy. Group names within each apply-groups statement should be listed in priority order. In one embodiment, only one apply-groups statement can be included at each specific level of the configuration hierarchy. In such an embodiment, the apply-groups statement at a specific hierarchy level lists the configuration groups to be added to the containing statement's list of configuration groups. Values specified at the specific hierarchy level override values inherited from the configuration group. Groups listed in nested apply-groups statements take priority over groups in outer statements.

In the following example, the BGP neighbor 10.0.0.1 inherits configuration data from group one first, then from groups two and three. Configuration data in group one overrides data in any other group. Data from group ten is used only if a statement is not contained in any other group.

```
apply-groups [eight nine ten];
protocols {
    apply-groups seven;
    bgp {
        apply-groups [five six];
        group some-bgp-group {
            apply-groups four;
            neighbor 10.0.0.1 {
                apply-groups [one two three];
            }
        }
    }
}
```

Referring once again to decision branch point 510, if the decoded input indicates an "expand configuration" line, for each line of the configuration information, as indicated by loop 541–547, it is determined whether or not the line is an "apply group" instruction, as indicated by decision branch point 543. If so, the lines of the configuration group "group-name" specified in the "apply group" instruction are retrieved.

Although not shown in FIG. 5, wildcards may be used to identify names and allow one (source) statement (e.g., in a configuration group) to provide data for a variety of (target) statements. For example, in the context of a router, grouping the configuration of the sonet-options statement over all SONET/SDH interfaces or the dead interval for OSPF over all ATM interfaces simplifies the creation and maintenance of configuration files for a router. Wildcarding in normal configuration data may be done using the following meta-characters:

Asterisk (*)—Matches any string of characters.
Question mark (?)—Matches any single character.
Open bracket ([)—Introduces a character class.
Close bracket (])—Indicates the end of a character class. If the close bracket is missing, the open bracket matches a [ rather than introducing a character class.
A character class matches any of the characters between the square brackets. Character classes must be enclosed in quotation marks (" ").
Hyphen (-)—Specifies a range of characters.
Exclamation point (!)—The character class can be complemented by making an exclamation point the first character of the character class. To include a "]" in a character class, make it the first character listed (after the "!", if any). To include a minus sign, make it the first or last character listed.

Wildcarding in configuration groups may use the same rules, but the wildcard pattern should be specially indicated by the user (e.g., enclosed in angle brackets (<pattern>)) to differentiate it from other wildcarding in the configuration file. For example:

```
[edit]
groups {
    sonet-default {
        interfaces {
            <so-*> {
                sonet-options {
                    payload-scrambler;
                    rfc-2615;
                }
            }
        }
    }
}
```

Wildcard expressions match (and provide configuration data for) existing statements in the configuration that match their expression only. In the example above, the expression <so-*> passes its sonet-options statement to any interface that matches the expression so-*.

Explicitly indicating wildcards (e.g., using angle brackets) allows users to pass normal wildcarding through without modification. In all matching strings within the configuration, whether it is done with or without wildcards, the first item encountered in the configuration that matches may be used. In the following example, data from the wild carded border gateway protocol ("BGP") groups is inherited in the order in which the groups are listed. The preference value from <*a*> overrides the preference in <*b*>, just as the out-delay value from <*c*> overrides the one from <*d*>. Data values from any of these groups override the data values from abcd.

```
[edit]
user@host# show
groups {
    one {
        protocols {
            bgp {
                group <*a*> {
                    preference 1;
                }
                group <*b*> {
                    preference 2;
                }
                group <*c*> {
                    out-delay 3;
                }
                group <*d*> {
                    out-delay 4;
                }
                group abcd {
                    preference 10;
                    hold-time 10;
                    out-delay 10;
                }
            }
        }
    }
}
protocols {
    bgp {
        group abcd {
            apply-groups one;
        }
    }
}
```

The forgoing configuration is equivalent to the following expanded configuration.

```
[edit]
user@host# show | display inheritance
protocols {
    bgp {
        group abcd {
            ##
            ## '1' was inherited from group 'one'
            ##
            preference 1;
            ##
            ## '10' was inherited from group 'one'
            ##
            hold-time 10;
            ##
            ## '3' was inherited from group 'one'
            ##
            out-delay 3;
        }
    }
}
```

Referring back to decision branch point 510, if the decoded input indicates an "overwrite" line, at least some specified inherited information (or any other configuration information) may be replaced with new (e.g., manually entered) information, as indicated by block 550.

Once again referring back to decision branch point 510, if the decoded input indicates a "display inheritance" (e.g., "show|display inheritance") line, for each line of the configuration information, as indicated by loop 561–569, it is determined whether or not the line is an "apply group" instruction as indicated by decision branch point 563. If so, the line that is inherited is visually emphasized, as indicated by block 567. The group-name from which the line was inherited may also be visually indicated. If, on the other hand, the line is not an "apply group" instruction, it is simply displayed as it would be under normal circumstances, as indicated by block 565.

The decoded line entered may specify other configuration operations (not shown). If a "quit" line is entered, the method 272″ is left via return node 570.

§ 4.3.3 Exemplary Hardware Architectures

Figure 20:
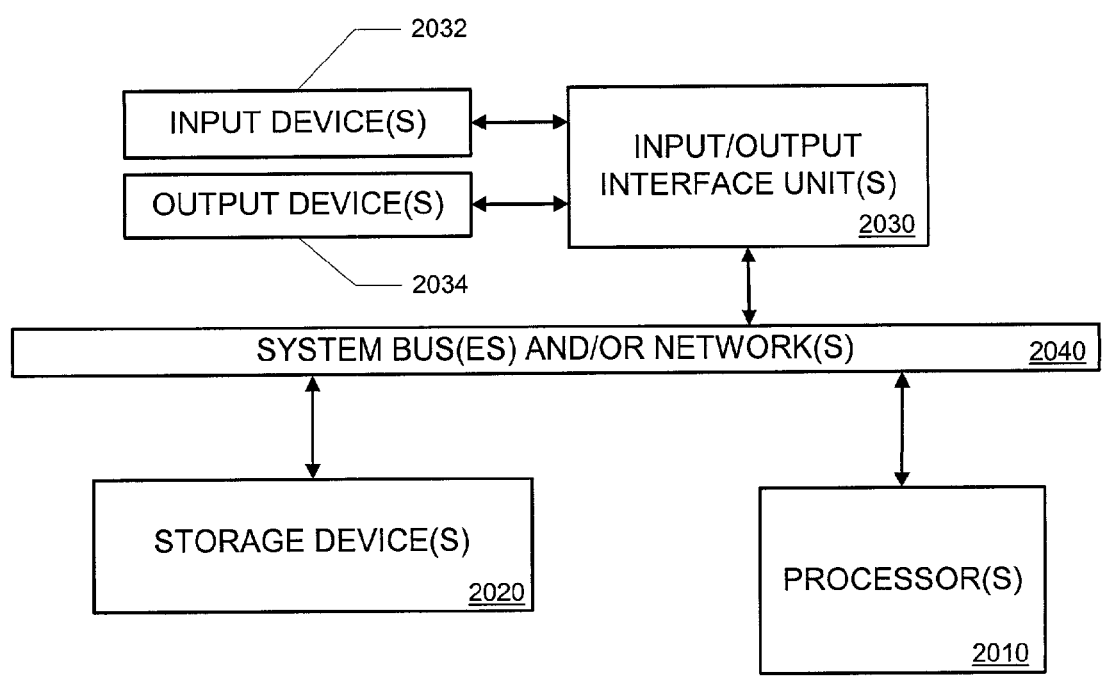
FIG. 20 is a high-level block diagram that illustrates an exemplary machine that may be used to effect various operations of the present invention.

FIG. 20 is high-level block diagram of a machine 2000 which may effect one or more of the operations, and store one or more of the data structures, discussed above. The machine 2000 basically includes a processor(s) 2010, an input/output interface unit(s) 2030, a storage device(s) 2020, and a system bus(es) and/or a network(s) 2040 for facilitating the communication of information among the coupled elements. An input device(s) 2032 and an output device(s) 2034 may be coupled with the input/output interface(s) 2030. Operations of the present invention may be effected by the processor(s) 2010 executing instructions. The instructions may be stored in the storage device(s) 2020 and/or received via the input/output interface(s) 2030. The instructions may be functionally grouped into processing modules.

The machine 2000 may be a router for example. In an exemplary router, the processor(s) 2010 may include a microprocessor and/or (e.g., custom) integrated circuit(s). In the exemplary router, the storage device(s) 2020 may include ROM, RAM, SDRAM, SRAM, SSRAM, DRAM, flash drive(s), hard disk drive(s), and/or flash cards. At least some of these storage device(s) 2020 may include program instructions defining an operating system, a protocol daemon, and/or other daemons. In a preferred embodiment, the methods of the present invention may be effected by a microprocessor executing stored program instructions. At least a portion of the machine executable instructions may be stored (temporarily or more permanently) on the storage device(s) 2020 and/or may be received from an external source via an input interface unit 2030. Finally, in the exemplary router, the input/output interface unit(s) 2030, input device(s) 2032 and output device(s) 2034 may include interfaces to terminate communications links. The input device(s) 2032 may include a keyboard.

Naturally, the operations of the present invention may be effected on systems other than routers, or on routers other than the exemplary router. Such other systems may employ different hardware and/or software.

§ 4.4 OPERATIONAL EXAMPLES IN EXEMPLARY EMBODIMENTS

Operational examples of creating and applying configuration groups, using wildcards, configuring sets of statements, configuring interfaces, configuring peer entities and establishing regional configurations are described in §§ 4.4.1 through 4.4.6 below.

§ 4.4.1 Operational Example of Create and Apply Configuration Groups Operations In this example, the simple network management protocol ("SNMP") part of a router configuration is divided between the group basic and the normal configuration hierarchy. There are a number of advantages to placing the system-specific configuration (SNMP contact) into a configuration group and thus separating it from the normal configuration hierarchy. For example, the user can replace (using the load replace command) either section without discarding data from the other. In addition, setting a contact for a specific box is now possible because the group data would be hidden by the router-specific data.

```
[edit]
groups {              # "groups" is a top-level statement
    basic {           # User defined group name
        snmp {        # This group contains some snmp data
            contact "My Engineering Group";
            community BasicAccess {
                authorization read-only;
            }
        }
    }
}
apply-groups basic;   #Enable inheritance from group "basic"
snmp {                # Some normal (non-group) configuration
    location "West of Nowhere";
}
```

The foregoing configuration is equivalent to the following expanded configuration:

```
[edit]
snmp {
    location "West of Nowhere";
    contact "My Engineering Group";
    community BasicAccess {
        authorization read-only;
    }
}
```

§ 4.4.2 Operational Example of Use Wildcards Operation

The following example demonstrates the use of wildcarding. The interface "so-0/0/0" inherits data from the various SONET/SDH interface wildcard patterns in group "one".

```
[edit]
user@host# show
groups {
    one {
        interfaces {
            <so-*> {
                sonet-options {
                    rfc-2615;
                }
            }
            <so-0/*> {
                sonet-options {
                    fcs 32;
                }
            }
            <so-*/0/*> {
                sonet-options {
                    fcs 16;
                }
            }
            <so-*/*/0> {
                sonet-options {
                    payload-scrambler;
                }
            }
        }
    }
}
apply-groups one;
interfaces {
    so-0/0/0 {
        unit 0 {
            family inet {
                address 10.0.0.1/8;
            }
        }
    }
}
```

The foregoing configuration is equivalent to the following expanded configuration. Note that the inherited configuration information are indicated as being inherited since the user entered the show command "piped through" a "display inheritance" command.

```
[edit]
user@host# show | display inheritance
interfaces
    so-0/0/0 {
        ##
        ## 'sonet-options' was inherited from group 'one'
        ##
        sonet-options {
            ##
            ## '32' was inherited from group 'one'
            ##
            fcs 32;
            ##
            ## 'payload-scrambler' was inherited from group 'one'
            ##
            payload-scrambler;
            ##
            ## 'rfc-2615' was inherited from group 'one'
            ##
            rfc-2615;
        }
        unit 0 {
            family inet {
                address 10.0.0.1/8;
            }
        }
    }
}
```

As the following example indicates, the combination of wildcarding and thoughtful use of names in statements gives the ability to tailor statement values.

```
[edit]
user@host# show
groups {
    mpls-conf {
        protocols {
            mpls {
                label-switched-path <*-major> {
                    retry-timer 5;
                    bandwidth 155m;
                    optimize-timer 60;
                }
                label-switched-path <*-minor> {
                    retry-timer 15;
                    bandwidth 64k;
                    optimize-timer 120;
                }
            }
        }
    }
}
apply-groups mpls-conf;
protocols {
    mpls {
        label-switched-path metro-major {
            to 10.0.0.10;
        }
        label-switched-path remote-minor {
            to 10.0.0.20;
        }
    }
}
```

The foregoing configuration is equivalent to the following expanded configuration. Note how the use of wildcards permits only the configuration group information on matching a part of apply-groups statement to be inherited. Again, the inherited configuration information are indicated as being inherited since the user entered the show command through a "display inheritance" pipeline.

```
[edit]
user@host# show | display inheritance
protocols {
    mpls {
        label-switched-path metro-major {
            to 10.0.0.10;
            ##
            ## '5' was inherited from group 'mpls-conf'
            ##
            retry-timer 5;
            ##
            ## '155m' was inherited from group 'mpls-conf'
            ##
            bandwidth 155m;
            ##
            ## '60' was inherited from group 'mpls-
            ## conf'
            ##
            optimize-timer 60;
        }
        label-switched-path remote-minor {
            to 10.0.0.20;
            ##
```

```
                ## '15' was inherited from group 'mpls-conf'
                ##
                retry-timer 15;
                ##
                ## '64k' was inherited from group 'mpls-conf'
                ##
                bandwidth 64k;
                ##
                ## '120' was inherited from group 'mpls-
                ## conf'
                optimize-timer 120;
            }
        }
    }
```

§ 4.4.3 Operational Example of Configuring Sets of Statements

When sets of statements exist in configuration groups, all values may be inherited. For example:

```
        [edit]
        user@host# show
        groups {
            basic {
                snmp {
                    interface so-1/1/1.0;
                }
            }
        }
        apply-groups basic;
        snmp {
            interface so-0/0/0.0;
        }
```

The foregoing configuration is equivalent to the following expanded configuration. Note that the inherited configuration information are indicated as being inherited since the user entered the show command is piped through a "display inheritance" command.

```
        [edit]
        user@host# show | display inheritance
        snmp {
            ##
            ## 'so-1/1/1.0' was inherited from group 'basic'
            ##
            interface [ so-0/0/0.0 so-1/1/1.0 ];
        }
```

For sets that are not displayed within brackets, all values may also be inherited. For example:

```
        [edit]
        user@host# show
        groups {
            worldwide {
                system {
                    name-server {
                        10.0.0.100;
                        10.0.0.200;
                    }
                }
            }
        }
        apply-groups worldwide;
```

```
        system {
            name-server {
                10.0.0.1;
                10.0.0.2;
            }
        }
```

The foregoing configuration is equivalent to the following expanded configuration. Note that the inherited configuration information are indicated as being inherited since the user entered the show command is piped through a "display inheritance" command.

```
        [edit]
        user@host# show | display inheritance
        system {
            name-server {
                10.0.0.1;
                10.0.0.2;
                ##
                ## '10.0.0.100' was inherited from group 'worldwide'
                ##
                10.0.0.100;
                ##
                ## '10.0.0.200' was inherited from group 'worldwide'
                ##
                10.0.0.200;
            }
        }
```

§ 4.4.4 Operational Example of Configuring Interfaces

In a router, configuration groups may be used to separate common interface media parameters from interface-specific addressing information. The following example places configuration data for asynchronous transfer mode ("ATM") interfaces into a group called atm-options:

```
        [edit]
        user@host# show
        groups {
            atm-options {
                interfaces {
                    <at-*> {
                        atm-options {
                            vpi 0 maximum-vcs 1024;
                        }
                        unit <*> {
                            encapsulation atm-snap;
                            point-to-point;
                            family iso;
                        }
                    }
                }
            }
        }
        apply-groups atm-options;
        interfaces {
            at-0/0/0 {
                unit 100 {
                    vci 0.100;
                    family inet {
                        address 10.0.0.100/30;
                    }
                }
                unit 200 {
                    vci 0.200;
                    family inet {
                        address 10.0.0.200/30;
                    }
```

-continued

```
            }
        }
    }
```

The foregoing configuration is equivalent to the following expanded configuration. Note that the inherited configuration information are indicated as being inherited since the user entered the show command is piped through a "display inheritance" command.

```
[edit]
user@host# show | display inheritance
interfaces {
    at-0/0/0 {
        ##
        ## 'atm-options' was inherited from group 'atm-options'
        ##
        atm-options {
            ##
            ## '1024' was inherited from group 'atm-options'
            ##
            vpi 0 maximum-vcs 1024;
        }
        unit 100 {
            ##
            ## 'atm-snap' was inherited from group 'atm-options'
            ##
            encapsulation atm-snap;
            ##
            ## 'point-to-point' was inherited from group 'atm-options'
            ##
            point-to-point;
            vci 0.100;
            family inet {
                address 10.0.0.100/30;
            }
            ##
            ## 'iso' was inherited from group 'atm-options'
            ##
            family iso;
        }
        unit 200 {
            ##
            ## 'atm-snap' was inherited from group 'atm-options'
            ##
            encapsulation atm-snap;
            ##
            ## 'point-to-point' was inherited from group 'atm-options'
            ##
            point-to-point;
            vci 0.200;
            family inet {
                address 10.0.0.200/30;
            }
            ##
            ## 'iso' was inherited from group 'atm-options'
            ##
            family iso;
        }
    }
}
[edit]
user@host# show | display inheritance except | ##
interfaces {
    at-0/0/0 {
        atm-options {
            vpi 0 maximum-vcs 1024;
        }
        unit 100 {
            encapsulation atm-snap;
            point-to-point;
            vci 0.100;
            family inet {
```

-continued

```
                address 10.0.0.100/30;
            }
            family iso;
        }
        unit 200 {
            encapsulation atm-snap;
            point-to-point;
            vci 0.200;
            family inet {
                address 10.0.0.200/30;
            }
            family iso;
        }
    }
}
```

§ 4.4.5 Operational Example of Configuring Peer Entities

In the following example, a group "some-isp", that contains configuration data relating to another Internet service provider ("ISP"), is created. Apply-group statements may then be inserted at any point to allow any location in the configuration hierarchy to inherit this data.

```
[edit]
user@host# show
groups {
    some-isp {
        interfaces {
            <ge-*> {
                gigether-options {
                    flow-control;
                }
            }
        }
        protocols {
            bgp {
                group <*> {
                    neighbor <*> {
                        remove-private;
                    }
                }
            }
            pim {
                interface <*> {
                    version 1;
                }
            }
        }
    }
}
interfaces {
    ge-0/0/0 {
        apply-groups some-isp;
        unit 0 {
            family inet {
                address 10.0.0.1/24;
            }
        }
    }
}
protocols {
    bgp {
        group main {
            neighbor 10.254.0.1 {
                apply-groups some-isp;
            }
        }
    }
}
```

```
            pim {
                interface ge-0/0/0.0 {
                    apply-groups some-isp;
                }
            }
        }
```

The foregoing configuration is equivalent to the following expanded configuration. Note that the inherited configuration information are indicated as being inherited since the user entered the show command through a "display inheritance" pipeline. Notice that the configuration information inherited from the "some-isp" configuration group was applied at different hierarchical levels within the "interfaces" and "protocols" configurations.

```
[edit]
user@host# show | display inheritance
interfaces {
    ge-0/0/0 {
        ##
        ## 'gigether-options' was inherited from group 'some-isp'
        ##
        gigether-options {
            ##
            ## 'flow-control' was inherited from group 'some-isp'
            ##
            flow-control;
        }
        unit 0 {
            family inet {
                address 10.0.0.1/24;
            }
        }
    }
}
protocols {
    bgp {
        group main {
            neighbor 10.254.0.1 {
                ##
                ## 'remove-private' was inherited from group
                'some-isp'
                ##
                remove-private;
            }
        }
    }
    pim {
        interface ge-0/0/0.0 {
            ##
            ## '1' was inherited from group 'some-isp'
            ##
            version 1;
        }
    }
}
```

§ 4.4.6 Operational Example of Establishing Regional Configurations

In the following example, one group is populated with configuration data that is standard throughout the company while another group contains regional deviations from this standard.

```
[edit]
user@host# show
groups {
```

```
    standard {
        interfaces {
            <t3-*> {
                t3-options {
                    compatibility-mode larscom subrate 10;
                    idle-cycle-flag ones;
                }
            }
        }
    }
    northwest {
        interfaces {
            <t3-*> {
                t3-options {
                    long-buildout;
                    compatibility-mode kentrox;
                }
            }
        }
    }
}
apply-groups standard;
interfaces {
    t3-0/0/0 {
        apply-groups northwest;
    }
}
```

The foregoing configuration is equivalent to the following expanded configuration. Note that the inherited configuration information are indicated as being inherited since the user entered the show command is piped through a "display inheritance" command.

```
[edit]
user@host# show | display inheritance
interfaces {
    t3-0/0/0 {
        ##
        ## 't3-options' was inherited from group 'northwest'
        ##
        t3-options {
            ##
            ## 'long-buildout' was inherited from group 'northwest'
            ##
            long-buildout;
            ##
            ## 'kentrox' was inherited from group 'northwest'
            ##
            compatibility-mode kentrox;
            ##
            ## 'ones' was inherited from group 'standard'
            ##
            idle-cycle-flag ones;
        }
    }
}
```

§ 4.5 CONCLUSIONS

As can be appreciated from the foregoing disclosure, by supporting configuration groups, the present invention allow users to create a (source) group containing configuration statements and to direct the inheritance of that group's statements at one or more places in the rest of the configuration (target). The same group can be applied to different sections of the configuration and different sections of one group's configuration statements can be inherited in different places in the configuration. In this way, configuration groups allow users to create smaller, more logically constructed configuration files, making it easier to configure and maintain, e.g., router, software. For example, users can group together statements that are repeated in many places in the configuration, such as when configuring interfaces, and thereby limit updates to just the group.

Users can also use wildcards in a configuration group to allow configuration data to be inherited by any object that matches a wildcard expression. The configuration group mechanism may be separate from the grouping mechanisms used elsewhere in the configuration, such as in border gateway protocol ("BGP") groups. Configuration groups provide a generic mechanism that can be used throughout the configuration, but that are known only to the command line user interface. The individual software daemons that perform the actions directed by the configuration information receive the expanded form of the configuration—they have no knowledge of configuration groups.

What is claimed is:

1. A method for generating configuration information for use by a data forwarding device, the method comprising:
   a) defining a configuration group, the configuration group including
      i) a configuration group name, and
      ii) configuration information;
   b) defining a target configuration; and
   c) specifying a point in the target configuration to inherit the configuration information of the configuration group,
wherein the act of specifying a point in the target configuration to inherit the configuration information of the configuration group includes entering an apply-group instruction, which identifies the configuration group name at the point in the target configuration.

2. The method of claim 1 wherein the target configuration is arranged in a hierarchy, and
   wherein any given level of the target configuration hierarchy may include only one apply-group instruction.

3. The method of claim 2 wherein if any values are specified at a particular level of the hierarchy of the target configuration, such values will override values that would otherwise be inherited from the configuration group.

4. The method of claim 1 wherein the configuration information includes a wildcard expression, the wildcard expression including a wildcard pattern part and associated wildcard configuration information, and
   wherein if an existing statement in the target configuration matches the wildcard pattern, then applying the wildcard configuration information from the wildcard expression to the existing statement.

5. The method of claim 1 wherein the configuration information included in the configuration group includes chassis configuration information.

6. The method of claim 1 wherein the configuration information included in the configuration group includes class-of-service configuration information.

7. The method of claim 1 wherein the configuration information included in the configuration group includes firewall configuration information.

8. The method of claim 1 wherein the configuration information included in the configuration group includes interfaces configuration information.

9. The method of claim 1 wherein the configuration information included in the configuration group includes SNMP configuration information.

10. The method of claim 1 wherein the configuration group consists of a group name and a plurality of configuration statements.

11. A method for expanding configuration information including a previously defined configuration group, the configuration group including a configuration group name and configuration information, the method comprising, for each piece of configuration information:
    a) determining whether or not the piece of configuration information is an instruction to apply the configuration group; and
    b) if it is determined that the piece of configuration information is an instruction to apply the configuration group, then replacing the piece of configuration information with the configuration information of the configuration group.

12. The method of claim 11 wherein the act of determining whether or not the piece of configuration information is an instruction to apply the configuration group is based on whether the piece of configuration information includes the configuration group name.

13. The method of claim 11 wherein the configuration information is arranged in a hierarchy, and
    wherein if a given hierarchical level of the configuration information includes at least two instructions to apply at least two different configuration groups, then the order of the at least two instructions in the configuration information will determine which one of the at least two different configuration groups will be applied.

14. The method of claim 11 wherein if it is determined that the piece of configuration information is an instruction to apply the configuration group, then further displaying, with visual emphasis, the configuration information of the configuration group; and
    c) if it is determined that the piece of configuration information is not an instruction to apply the configuration group, then displaying the piece of configuration information.

15. The method of claim 14 wherein if it is determined that the piece of configuration information is an instruction to apply the configuration group, then, further displaying the group name of the configuration group.

16. The method of claim 11 wherein the configuration group consists of a group name and a plurality of configuration statements.

17. A machine-readable medium having stored thereon configuration information for use by a data forwarding device, the configuration information comprising:
    a) a configuration group including
       i) a configuration group name, and
       ii) configuration information; and
    b) target configuration information including, at a particular point in the target configuration information, an apply group instruction which identifies the configuration group name.

18. The machine-readable medium of claim 17 wherein the target configuration information is arranged in a hierarchy.

19. The machine-readable medium of claim 18 wherein the configuration information arranged in a hierarchy includes container configuration statements and leaf configuration statements, thereby defining the hierarchical arrangement.

20. The machine-readable medium of claim 17 wherein the configuration information of the configuration group includes a wildcard expression, the wildcard expression including a wildcard pattern part and associated wildcard configuration information, and
    wherein if an existing statement in the target configuration matches the wildcard pattern, then the wildcard configuration information from the wildcard expression is to be applied to the existing statement.

21. The machine-readable medium of claim 17 wherein the configuration group consists of a group name and a plurality of configuration statements.

22. A data forwarding device comprising:
a) a data forwarding table;
b) a forwarding facility for forwarding data based on information in the data forwarding table;
c) a storage facility for storing configuration information for use in the operation of the data forwarding device, the configuration information comprising:
   i) a configuration group including
      A) a configuration group name, and
      B) configuration information; and
   ii) target configuration information including, at a particular point in the target configuration information, an apply group instruction which identifies the configuration group name.

23. The data forwarding device of claim 22 further comprising:
d) interfaces for receiving and transmitting data, wherein the configuration information includes statements to configure the interfaces.

24. The data forwarding device of claim 23 wherein the configuration information of the configuration group includes statements to configure the interfaces.

25. The data forwarding device of claim 23 wherein the configuration information of the configuration group is applied conditionally, based on at least one characteristic of the interfaces of the data forwarding device.

26. The data forwarding device of claim 22 further comprising:
d) a routing facility, wherein the configuration information includes statements to configure the routing facility.

27. The data forwarding device of claim 26 wherein the configuration information of the configuration group includes statements to configure the routing facility.

28. The data forwarding device of claim 26 wherein the configuration information of the configuration group is applied conditionally, based on at least one characteristic of the routing facility of the data forwarding device.

29. The data forwarding device of claim 22 wherein the configuration group consists of a group name and a plurality of configuration statements.

30. A machine-readable medium storing an instruction set for configuring a data processing device, the instruction set comprising:
a) a first command supporting user input of a configuration group, the configuration group including
   i) a configuration group name, and
   ii) configuration information;
b) a second command supporting user input of a target configuration; and
c) a third command supporting user input of a point in the target configuration to inherit the configuration information of the configuration group,
wherein the third command supports user input of an apply-group instruction, which identifies the configuration group name, at the point in the target configuration.

31. The machine-readable medium of claim 30 wherein the first command supports user input of a wildcard expression as configuration information, the wildcard expression including a wildcard pattern part and associated wildcard configuration information, the instruction set further comprising:
d) means for applying the wildcard configuration information from the wildcard expression to an existing statement if the existing statement in the target configuration matches the wildcard pattern.

32. An apparatus for expanding configuration information including a previously defined configuration group, the configuration group including a configuration group name and configuration information, the apparatus comprising:
a) means for determining, for each piece of configuration information, whether or not the piece of configuration information is an instruction to apply the configuration group; and
b) means for replacing, for each piece of configuration information, the piece of configuration information with the configuration information of the configuration group if it is determined that the piece of configuration information is an instruction to apply the configuration group.

33. The apparatus of claim 32 wherein the means for determining whether or not the piece of configuration information is an instruction to apply the configuration group consider whether the piece of configuration information includes the configuration group name.

34. The apparatus of claim 32 wherein the configuration group consists of a group name and a plurality of configuration statements.

35. A machine-readable medium storing an instruction set for configuring a data processing device, the instruction set comprising:
a) a first command supporting user input of a configuration group, the configuration group including
   i) a configuration group name, and
   ii) configuration information;
b) a second command supporting user input of a target configuration; and
c) a third command supporting user input of a point in the target configuration to inherit the configuration information of the configuration group,
wherein the first command supports user input of the configuration group via a command line interface, wherein the second command supports user input of a target configuration via the command line interface, and wherein the third command supports user input of a point in the target configuration to inherit the configuration information of the configuration group via the command line interface.

36. The method of claim 1 wherein the configuration information includes a configuration statement.

* * * * *